US008428455B2

(12) United States Patent
Asai et al.

(10) Patent No.: US 8,428,455 B2
(45) Date of Patent: Apr. 23, 2013

(54) IMAGE PICKUP UNIT AND IMAGE PICKUP APPARATUS

(75) Inventors: Yoshikazu Asai, Yokohama (JP); Masanori Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/871,654

(22) Filed: Aug. 30, 2010

(65) Prior Publication Data

US 2011/0058805 A1   Mar. 10, 2011

(30) Foreign Application Priority Data

Sep. 8, 2009 (JP) ................................. 2009-207371
Jan. 5, 2010 (JP) ................................. 2010-000674
Jan. 15, 2010 (JP) ................................. 2010-007337

(51) Int. Cl.
*G03B 17/02* (2006.01)
(52) U.S. Cl.
USPC ........................... 396/535; 348/340; 359/513
(58) Field of Classification Search .................. 396/535; 348/340; 359/513
See application file for complete search history.

(56) References Cited

U.S. PATENT DOCUMENTS

| 2008/0079812 A1* | 4/2008 | Yamamoto | 348/207.99 |
| 2010/0091121 A1* | 4/2010 | Kawai | 348/208.7 |
| 2011/0115975 A1* | 5/2011 | Konishi et al. | 348/374 |

FOREIGN PATENT DOCUMENTS

| JP | 2008-26564 A | 2/2008 |
| JP | 2008-131396 A | 6/2008 |

OTHER PUBLICATIONS

Translation of JP Publication No. 2008-131397; Inventor: Uenaka, Yasuhiro; Publication Date: Jun. 5, 2008.*
Translation of JP Publication No. 2008-193574; Inventor: Hase, Hiroyuki; Publication Date: Aug. 21, 2008.*

* cited by examiner

*Primary Examiner* — Rodney Fuller
*Assistant Examiner* — Fang-Chi Chang
(74) *Attorney, Agent, or Firm* — Canon U.S.A., Inc. IP Division

(57) ABSTRACT

An apparatus includes an image sensor unit, a retaining member configured to retain the image sensor unit on a photographer side and to retain an optical member on an object side, a first sealing member configured, when the image sensor unit is mounted on the retaining member, to form a closely sealed space by sealing between the image sensor unit and the retaining member, the first sealing member being provided on the photographer side of the retaining member, and a second sealing member configured, when the optical member is mounted on the retaining member, to form a closely sealed space by sealing between the optical member and the retaining member, the second sealing member being provided on the object side.

20 Claims, 16 Drawing Sheets

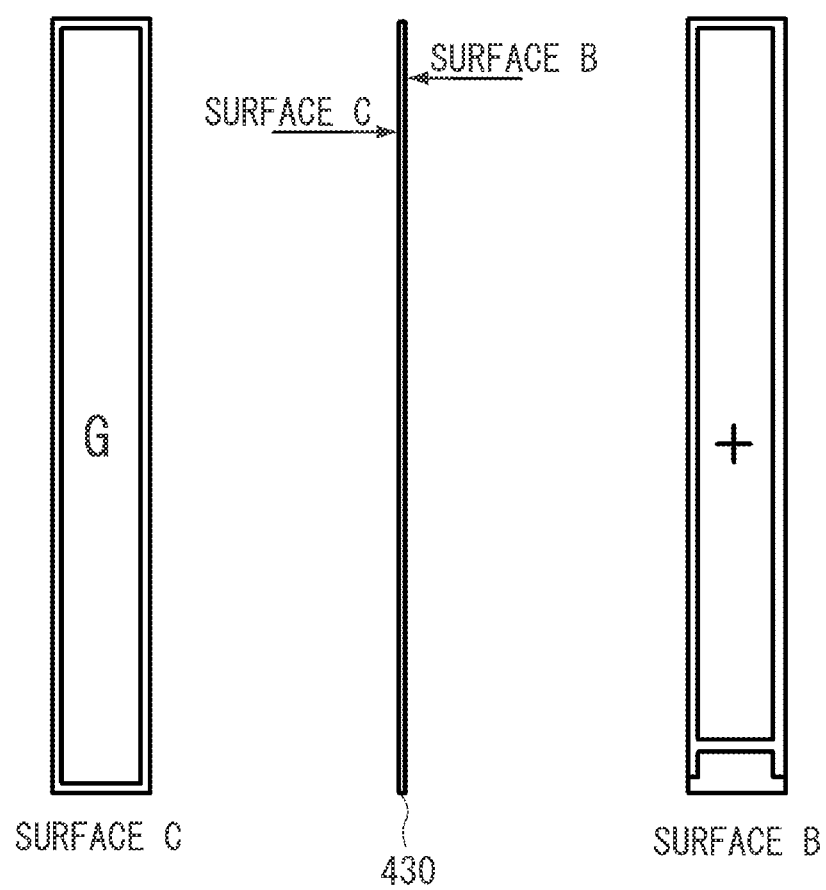

DIRECTION OF
OPTICAL AXIS

IMAGE PICKUP UNIT AND IMAGE PICKUP APPARATUS

BACKGROUND OF THE INVENTION

1. Field of the Invention

The present invention relates to an image pickup unit including an optical element, which is provided on an optical axis, and an image sensor, which is retained by a retaining member, and an image pickup apparatus including the image pickup unit.

2. Description of the Related Art

An image pickup apparatus, such as a digital camera, which converts an object image into an electric signal, receives a light flux of the object image on an image sensor. Furthermore, the image pickup apparatus converts the electric signal, which is output from the image sensor, into image data. In addition, the image pickup apparatus records the resulting image data on a recording medium, such as a memory card. As the image sensor, a charge-coupled device (CCD) sensor or a complementary metal oxide semiconductor (CMOS) sensor is used.

The image pickup apparatus like this includes an optical low-pass filter and an infrared cut filter, which are provided on the object side of the image sensor. If any foreign matters, such as dusts, adhere to the surface of the filter, the adhered matter may appear on a captured image. In this case, the image quality may degrade.

In particular, in a digital single lens reflex camera including an interchangeable lens unit, mechanical operational units, such as a shutter or a quick-return mirror, are provided in the vicinity of the image sensor. Accordingly, foreign matters, such as dusts, which have come out from the operation units, may adhere to the surface of the image sensor or the filter. In addition, during an operation for changing the lens unit, foreign matters, such as dusts, may enter into the camera body via an opening of a lens mount. In this case, the intruded foreign matters may adhere to the surface of the image sensor or the filter.

In order to prevent the above-described phenomena, Japanese Patent Application Laid-Open No. 2008-26564 discusses a method for removing foreign matters, such as dusts, which have adhered to the surface of an optical element, which is provided on the object side of an image sensor, by causing the optical element to vibrate by using a piezoelectric element.

More specifically, the method discussed in Japanese Patent Application Laid-Open No. 2008-26564 includes a vibration unit configured to vibrate the optical element, which is provided on an optical axis, in a wave-like manner. Furthermore, the above-described conventional method removes dusts or other foreign matters that have adhered to the surface of the optical element by causing the optical element to resonate in two or more vibration modes.

However, in the method discussed in Japanese Patent Application Laid-Open No. 2008-26564, an image sensor retaining member, which is supported by a mirror box, is provided separately from an optical element retaining member, which is configured to support an optical element including the vibration unit. Accordingly, in this case, the number of necessary parts may become large. In addition, in this case, the number of worker-hours for assembling the camera may become also large.

In addition, because an optical element unit and an image sensor unit are sealed by a two-sided adhesive rubber sheet, it is difficult to peel off the two-sided adhesive rubber sheet at the time of rework.

SUMMARY OF THE INVENTION

According to an aspect of the present invention, an apparatus includes an image sensor unit, a retaining member configured to retain the image sensor unit on a photographer side and to retain an optical member on an object side, a first sealing member configured, when the image sensor unit is mounted on the retaining member, to form a closely sealed space by sealing between the image sensor unit and the retaining member, the first sealing member being provided on the photographer side, and a second sealing member configured, when the optical member is mounted on the retaining member, to form a closely sealed space by sealing between the optical member and the retaining member, the second sealing member being provided on the object side.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 illustrates an example of a piezoelectric element.

DESCRIPTION OF THE EMBODIMENTS

Various exemplary embodiments, features, and aspects of the invention will be described in detail below with reference to the drawings.

Now, a digital single-lens reflex camera, which is an example of an image pickup apparatus including an image pickup unit according to an exemplary embodiment of the present invention, will be described in detail below with reference to the attached drawings.

<A1. Exemplary Outline Configuration of the Camera>
<A1-1. Mechanical Configuration (FIGS. 1 and 2)>

To begin with, an exemplary mechanical configuration, of an outline configuration of the camera, will be described in detail below with reference to FIGS. 1 and 2.

Figure 1:
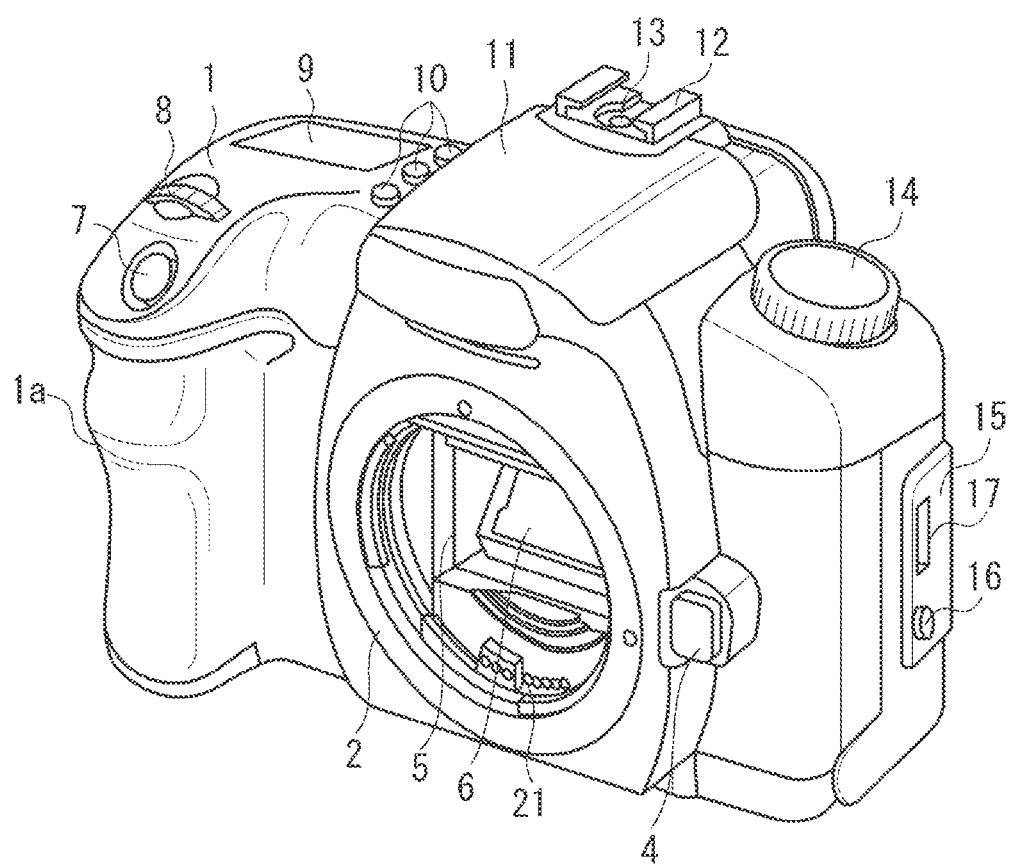
FIG. 1 is a perspective diagram of a digital single lens reflex camera according to a first exemplary embodiment of the present invention viewed from the front thereof.

FIG. 1 is a perspective diagram of a digital single lens reflex camera according to a first exemplary embodiment of the present invention. More specifically, FIG. 1 is a perspective view of the camera viewed from the front (object side) thereof. In the example illustrated in FIG. 1, a photographic lens unit has been dismounted from the camera. Referring to FIG. 1, a camera body 1 includes a grip portion 1a. The grip portion 1a protrudes towards the object side so that a photographer (a user of the camera) can easily and securely hold the camera during a shooting operation.

A photographic lens unit 200a (not illustrated in FIGS. 1 and 2) is detachably mounted on a mounting portion 2 of the camera body 1. A mount contacts 21 enables communication for transmitting and receiving various signals, such as a control signal, a status signal, or a data signal, between the camera body 1 and the photographic lens unit 200a (not illustrated). In addition, power is supplied to the photographic lens unit 200a (not illustrated) via the mount contacts 21.

It is also useful if the mount contacts 21 are configured so that communication other than electric communication, such as optical communication or audio communication, can be executed via the mount contacts 21, in addition to executing electric communication via the mount contacts 21. A lens lock release button 4 is provided to the side of the mounting portion 2. The lens lock release button 4 is pressed in when dismounting the photographic lens unit 200a.

A mirror box 5 is provided inside the camera body 1. A light flux of an object image, which has already been passed through the photographic lens, is guided into the mirror box 5. In addition, the mirror box 5 includes a main mirror (quick-return mirror) 6. The attitude of the main mirror 6 can be changed to and kept at an angle of 45° with respect to a imaging optical axis, which attitude being used for guiding the light flux of the object image towards the pentagonal roof mirror 22 (see FIG. 3). In addition, the attitude of the main mirror 6 can also be changed to and kept at a position at which the main mirror 6 is retracted from the light flux of the object image so that the light flux of the object image is guided towards an image sensor 33 (see FIG. 3).

In an upper portion of the camera close to the grip portion 1a, a release button 7, a main operation dial 8, and a body top-provided shooting system operation mode setting button 10 are provided. The release button 7 is a switch for starting a shooting operation. The main operation dial 8 is a dial for setting the shutter speed and the diaphragm value set for a lens according to an operation mode set and used during shooting. A part of results of the operations by the above-described operation members is displayed on a liquid crystal display (LCD) panel 9.

When the release button 7 is pressed by a first stroke (i.e., when the release button 7 is half-pressed), the SW1 7a is "ON". Furthermore, when the release button 7 is pressed by a second stroke (i.e., when the release button 7 is fully pressed), the SW2 7b is "ON". In addition, the body top-provided shooting system operation mode setting button 10 is a button for changing the shooting mode of the camera by one pressing operation on the release button 7, among shooting modes, such as a continuous shooting mode, a frame-by-frame shooting mode, or a self-timer shooting mode. The status of the setting of the shooting mode is displayed on the LCD panel 9.

In the center portion of the top surface of the camera, a flash unit 11, which pops up from the camera body 1 when used, a flash mounting shoe groove 12, and a flash contact 13 are provided. In the right portion of FIG. 1, i.e., in the left portion of the top surface of the camera viewed from the photographer, a shooting mode setting dial 14 is provided.

On a side of the camera opposite to the side on which the grip portion 1a is provided, an open-close external terminal lid 15, which can be opened and closed, is provided. In a portion hidden by the open-close external terminal lid 15, external interfaces, such as a video signal output jack 16 and a universal serial bus (USB) output connector 17 are provided.

Figure 2:
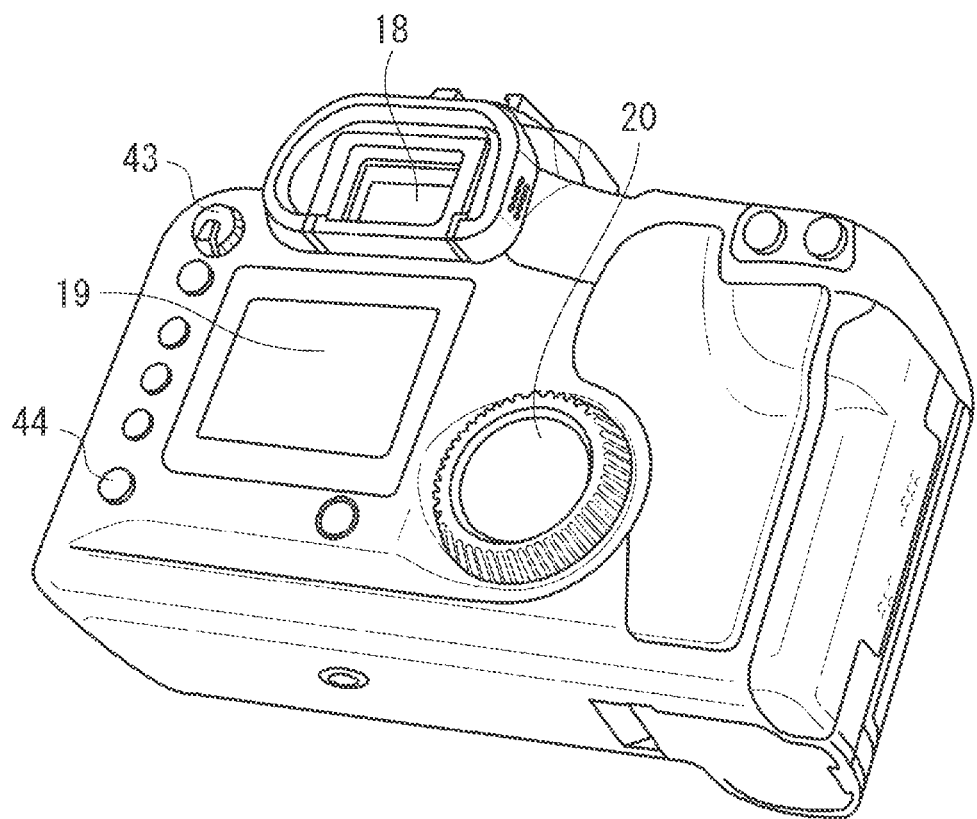
FIG. 2 is a perspective diagram of the digital single lens reflex camera according to the first exemplary embodiment of the present invention viewed from behind.

FIG. 2 is a perspective diagram illustrating an external appearance of the digital single lens reflex camera according to the present exemplary embodiment. More specifically, FIG. 2 is a perspective view of the camera viewed from the photographer (i.e., viewed from the back side of the camera). Referring to FIG. 2, in an upper portion of the camera on the back side thereof, a viewfinder eyepiece window 18 is provided. In addition, a color liquid crystal monitor 19, which is capable of displaying an image, is provided at a portion close to the center portion of the camera back side.

Furthermore, a sub operation dial 20 is provided to the side of the color liquid crystal monitor 19. The sub operation dial 20 functions as an auxiliary dial for the main operation dial 8. More specifically, during auto exposure (AE) mode of the camera, the sub operation dial 20 is used for setting an exposure correction amount for an appropriate exposure value calculated by an auto exposure device.

On the other hand, in a manual shooting mode, in which each of the shutter speed and the diaphragm value for the lens is set as desired by the photographer (user), the user sets the shutter speed by operating the main operation dial 8. Furthermore, in the manual shooting mode, the photographer sets the diaphragm value for the lens by operating the sub operation dial 20. In addition, the sub operation dial 20 is used for selecting a captured image to be displayed on the color liquid crystal monitor 19.

In addition, on the back side of the camera, a main switch 43 and a cleaning instruction operation member 44 are provided. The main switch 43 is a switch for starting and stopping an operation of the camera. The cleaning instruction operation member 44 is operated for starting a cleaning mode. As will be described in detail below, the photographer can instruct an operation for removing foreign matters, such as dusts, from the surface of an optical low-pass filter 410 by applying vibration thereon.

The cleaning mode can be arbitrarily operated by using the cleaning instruction operation member 44. More specifically, the cleaning mode can be automatically activated at an arbitrary timing, such as a timing at which the main switch 43 is turned ON or OFF, or at both such timings.

<A1-2. Electric Configuration (FIG. 3)>

Figure 3:
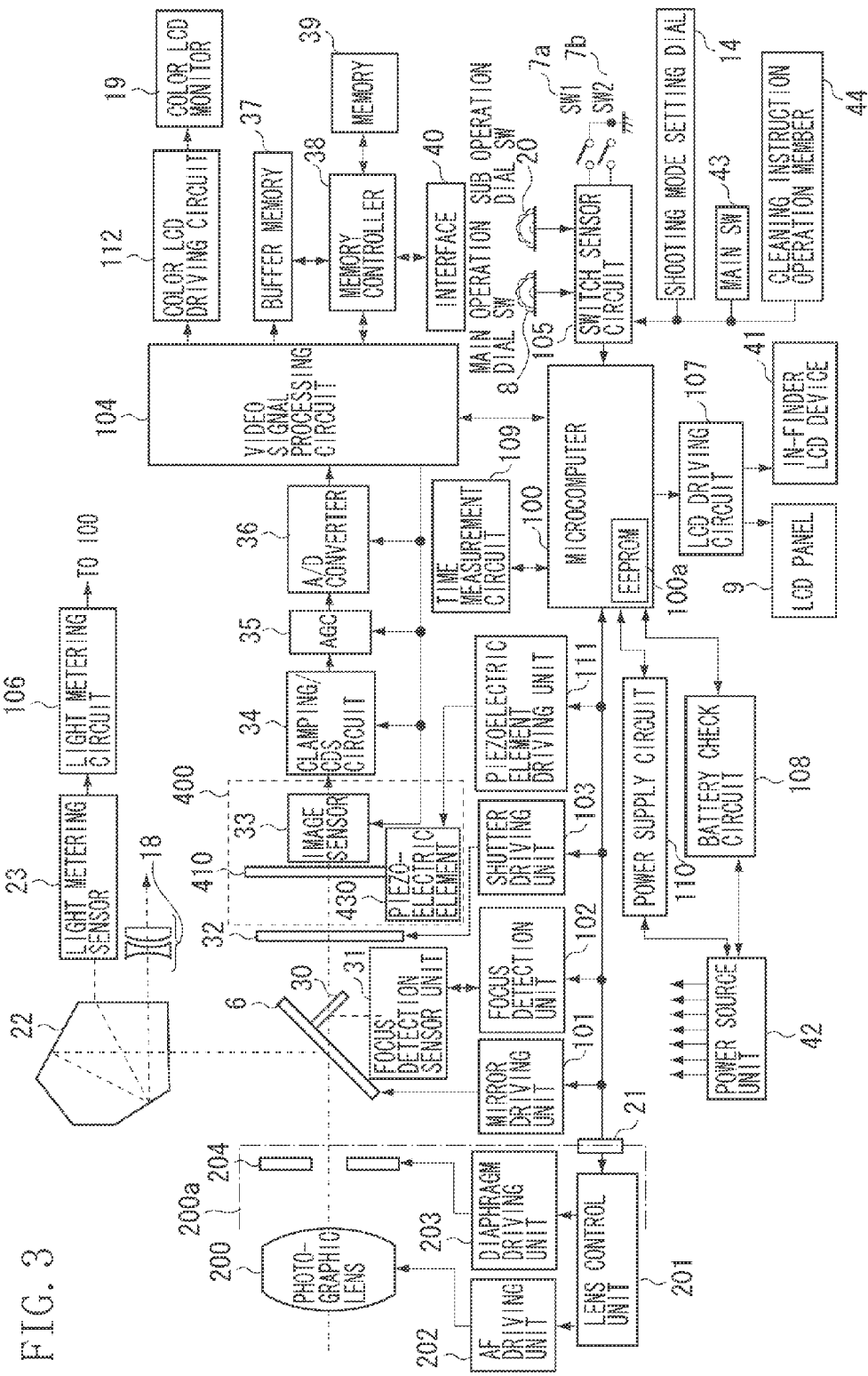
FIG. 3 is a block diagram illustrating an exemplary electrical configuration of the digital single lens reflex camera according to the first exemplary embodiment.

FIG. 3 is a block diagram illustrating an exemplary primary electrical configuration of the digital single lens reflex camera according to the present exemplary embodiment. Components, units, and portions that have been already described above with reference to FIGS. 1 and 2 are provided with the same reference numerals and symbols.

Referring to FIG. 3, a micro processing unit (MPU) 100, which includes a microcomputer and is built in inside the camera body 1, controls the operation of the entire camera. In addition, the MPU 100 executes control of each component of the camera for executing various processing and instructed operations. An electrically erasable programmable ROM (EEPROM) 100a, which is included in the MPU 100, can store time information, which is information about time measured by a time measurement circuit 109, and other information.

A mirror driving unit 101, a focus detection unit 102, a shutter driving circuit 103, a video signal processing circuit 104, a switch sensor circuit 105, and a light metering circuit 106 are connected to the MPU 100. In addition, an LCD driving circuit 107, a battery check circuit 108, the time measurement circuit 109, a power supply circuit 110, and a piezoelectric element driving circuit 111 are also connected to the MPU 100. The above-described units and circuits operate under control of the MPU 100.

The MPU 100 executes communication via a lens control circuit 201 and mount contacts 21, which are included in the photographic lens unit 200a. The mount contacts 21 also has a function for transmitting a signal to the MPU 100 when the photographic lens unit 200a is connected to the camera.

Via the mount contacts 21, the lens control circuit 201 executes communication with the MPU 100 and drives a photographic lens 200 and a diaphragm 204, which are included in the photographic lens unit 200a, via an auto focus (AF) driving unit 202 and a diaphragm driving unit 203.

In the example illustrated in FIG. 3, the number of the photographic lens 200 is one, merely for easier understanding. In an actually manufactured camera, the photographic lens unit 200a (not illustrated) includes a plurality of lens units.

The AF driving unit 202 includes a stepping motor. Furthermore, the lens control circuit 201 executes control of the photographic lens 200 so that the position of the focus lens included in the photographic lens 200 is changed to a position at which the light flux of the object image is focused on the image sensor 33. A diaphragm driving unit 203 includes an automatic iris. Under control of the lens control circuit 201, the diaphragm driving unit 203 changes the aperture value for the diaphragm 204 to achieve an optical diaphragm value.

The main mirror 6, while being kept at the angle of 45° with respect to the imaging optical axis (FIG. 3), guides the light flux of the object image that has been passed through the photographic lens 200 to the pentagonal roof mirror 22. In addition, a part of the light flux of the object image is passed through the main mirror 6, and then is guided to a sub mirror 30. The sub mirror 30 guides the light flux of the object image that has passed through the main mirror 6 to a focus detection sensor unit 31.

The mirror driving unit 101 includes a direct current (DC) motor and a gear train. The mirror driving unit 101 drives the main mirror 6 to a position at which the photographer can view an object image via the viewfinder and to another position at which the main mirror 6 is retracted from the light flux of the object image. The sub mirror 30 is moved to a position at which the light flux of the object image is guided to the focus detection sensor unit 31 and to another position at which the sub mirror 30 is retracted from the light flux of the object image simultaneously as the main mirror 6 is driven.

The focus detection sensor unit 31 includes a field lens (not illustrated), which is provided in the vicinity of an image plane, a reflection mirror, a secondary image forming lens, a diaphragm, and a line sensor including a plurality of CCDs. The focus detection sensor unit 31 executes phase difference focus detection. A signal output from the focus detection sensor unit 31 is transmitted to the focus detection unit 102. The signal is converted into an object image signal by the focus detection unit 102. Then the converted signal is transmitted to the MPU 100.

The MPU 100 executes focusing detection operation by a phase difference detection method according to the object image signal. Furthermore, the MPU 100 calculates a defocus amount and direction. According to the calculated defocus amount and direction, the MPU 100 drives the focus lens included in the photographic lens 200 to an in-focus position via the lens control circuit 201 and the AF driving unit 202.

The pentagonal roof mirror 22 converts and reflects the light flux of the object image, which has been reflected on the main mirror 6, into an erect image. The photographer can observe the object image through the viewfinder eyepiece window 18 via a viewfinder optical system. The pentagonal roof mirror 22 also guides a part of the light flux of the object image into a light metering sensor 23.

The light metering circuit 106 receives an output of the light metering sensor 23 and converts the received output into a luminance signal corresponding to each area on the observation target plane. Furthermore, the light metering circuit 106 outputs the converted luminance signal to the MPU 100. In addition, the MPU 100 calculates an exposure value according to the received luminance signal.

A shutter leading blade of a shutter unit 32, which is a mechanical focal plane shutter, is located at a light-shielding position when the photographer is observing the object image via the viewfinder while a shutter trailing blade thereof is located at an exposure position.

Then, during shooting, the shutter leading blades move from the light-shielding position to the exposure position (i.e., the shutter leading blade is moved by exposure driving) to let the light reflected from the object to enter the shutter unit 32 and allow the image sensor 33 to capture an object image. After a desired shutter time period has elapsed, the leading blade of the shutter unit 32 is moved from the exposure position to the light-shielding position. Then, the shooting operation ends.

The shutter unit 32 is controlled by the shutter driving circuit 103 according to a command received from the MPU 100.

An image pickup unit 400 includes, as a unit, the optical low-pass filter 410, a piezoelectric element 430, an image sensor unit (image pickup unit) 33a including the image sensor 33, and other parts, as described below.

The image sensor 33 executes photoelectrical conversion of the object image. In the present exemplary embodiment, a CMOS sensor is used. However, the present exemplary embodiment is not limited to this. More specifically, it is also useful if any appropriate type imaging device, such as a CCD sensor or a charge injection device (CID), is used as the image sensor 33.

The optical low-pass filter 410, which is provided in front of the image sensor unit 33a, includes one piece of birefringent plate made of crystal. The optical low-pass filter 410 has a rectangular shape. The piezoelectric element 430 is a single-panel piezoelectric element (piezoelectric element). In addition, the piezoelectric element 430 is vibrated by the piezoelectric element driving circuit 111. The vibration generated by the piezoelectric element driving circuit 111 is transmitted to the optical low-pass filter 410.

A clamping/correlated double sampling (CDS) circuit 34 executes basic analog processing before analog-to-digital (A/D) conversion. The level of clamping can be changed.

An automatic gain control (AGC) apparatus 35 executes basic analog processing before the A/D conversion. The basic level of control by the AGC 35 can be changed. The A/D converter 36 converts an analog output signal of the image sensor 33 into a digital signal.

The video signal processing circuit 104 executes various hardware image processing, such as gamma knee processing, filtering, or processing for combining information to be displayed on the monitor, on digitized image data. The image data to be displayed on the monitor, which is transmitted from the video signal processing circuit 104, is displayed on the color liquid crystal monitor 19 via a color LCD driving circuit 112.

In addition, the video signal processing circuit 104 can store the image data on the buffer memory 37 via the memory controller 38 according to an instruction from the MPU 100. Furthermore, the video signal processing circuit 104 can execute processing for compressing image data, such as Joint Photographic Experts Group (JPEG) compression processing.

When serially shooting images in the continuous shooting mode or the like, the image data is temporarily stored on the buffer memory 37. Unprocessed image data can be serially read via the memory controller 38. Accordingly, the video signal processing circuit 104 can serially execute image processing and image compression processing regardless of the speed of inputting image data from the A/D converter 36.

The memory controller 38 executes control for storing image data input from an external interface (I/F) 40 on the memory 39. In addition, the memory controller 38 includes a function for outputting the image data stored on the memory 39 via the external I/F 40. The video signal output jack 16 and the USB output connector 17, which are illustrated in FIG. 1, are equivalent to the external I/F 40. As the memory 39, a flash memory that can be detached from the camera body 1 is used.

The switch sensor circuit 105 transmits an input signal to the MPU 100 according to the status of operation of each switch. When the release button 7 is pressed by the first stroke (i.e., when the release button 7 is half-pressed), the SW1 7a is "ON". Furthermore, when the release button 7 is pressed by the second stroke (i.e., when the release button 7 is fully pressed), the SW2 7b is "ON". When the SW2 7b is "ON", an instruction for starting shooting is transmitted to the MPU 100.

In addition, the main operation dial 8, the sub operation dial 20, the shooting mode setting dial 14, the main switch 43, and the cleaning instruction operation member 44 are connected to the switch sensor circuit 105.

The LCD driving circuit 107 drives the LCD panel 9 and an in-finder LCD device 41 according to an instruction from the MPU 100. The battery check circuit 108 checks the battery according to an instruction from the MPU 100. In addition, the battery check circuit 108 transmits a result of the checking to the MPU 100.

A power source unit 42 supplies power to each component of the camera. The time measurement circuit 109 measures a time interval from a timing at which the camera is powered off by operating the main switch 43 to a timing at which the camera is powered on thereafter. Furthermore, the time measurement circuit 109 transmits a result of the measurement according to an instruction from the MPU 100.

<A2. Exemplary Configuration of the Image Pickup Unit (FIGS. 4 Through 9>

<A2-1. Outline Configuration of the Image Pickup Unit Inside the Camera in FIG. 4>

Now, an exemplary outline configuration of the image pickup unit 400 according to the present exemplary embodiment will be described in detail below.

Figure 4:
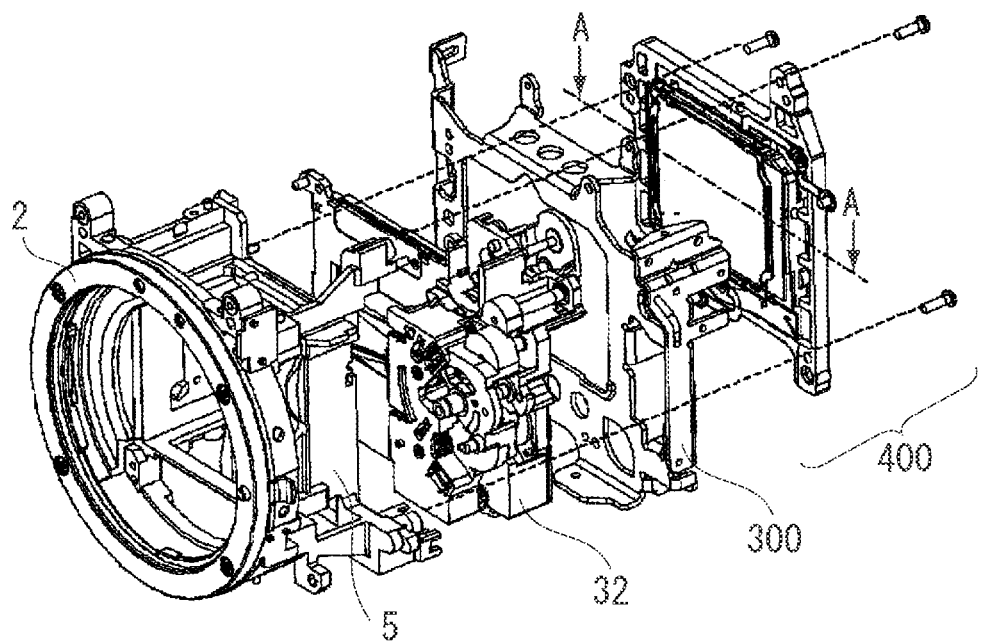
FIG. 4 is an exploded perspective diagram illustrating an exemplary inner configuration of the camera, which primarily illustrates an exemplary configuration for retaining an image pickup unit included in the camera according to the first exemplary embodiment of the present invention.

Referring to FIG. 4, on the object side of a camera chassis 300, which functions as a skeletal frame of the camera body 1, the mirror box 5 and the shutter unit 32 are provided in this order from the object side to the image side. On the photographer side of the camera chassis 300, the image pickup unit 400 is provided.

For the image pickup unit 400, the image plane of the image sensor 33 is fixed onto a mounting surface of the mounting portion 2, which surface is the criterion of mounting the photographic lens unit, in such a manner that the image plane of the image sensor 33 is parallel to the mounting surface of the mounting portion 2 with a predetermined clearance.

<A2-2. Configuration of the Image Pickup Unit (FIGS. 5A and 5B)>

Figure 5A:
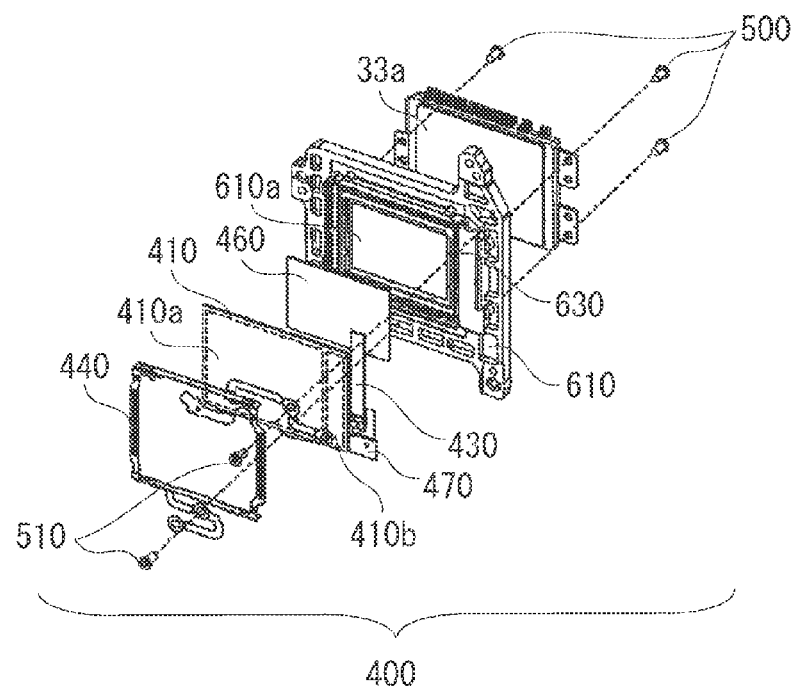
FIGS. 5A and 5B are exploded perspective diagrams illustrating an exemplary configuration of an image pickup unit according to the first exemplary embodiment of the present invention.
Figure 5B:
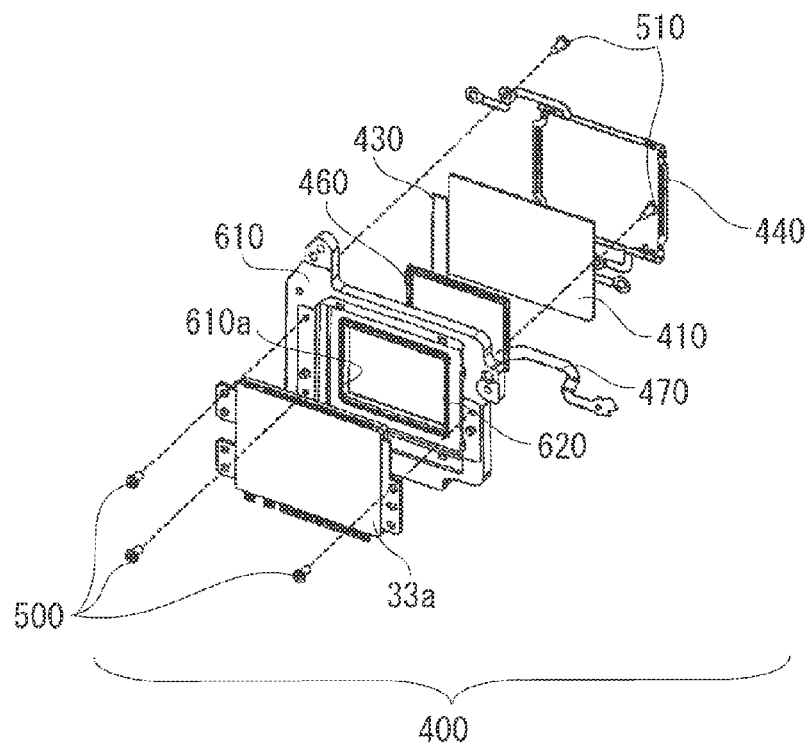

FIG. 5A is a perspective diagram illustrating an example of the image pickup unit 400 according to the present exemplary embodiment viewed from the object side. FIG. 5B is a perspective diagram illustrating an example of the image pickup unit 400 according to the present exemplary embodiment viewed from the photographer side. Referring to FIGS. 5A and 5B, the optical low-pass filter 410 is one piece of birefringent plate made of crystal. The optical low-pass filter 410 has a rectangular shape.

The optical low-pass filter 410 corresponds to the optical member of the present invention. The optical low-pass filter 410 has a peripheral portion 410b, which is provided on one edge portion of an effective shooting area 410a. The piezoelectric element 430 is provided on the peripheral portion 410b. The optical low-pass filter 410 is asymmetric in a direction perpendicular to the imaging optical axis (i.e., in a horizontal direction of the camera). The surface of the optical low-pass filter 410 having the above-described configuration is optically coated.

The piezoelectric element 430 is a single plate having a strip-like shape. On the peripheral portion 410b of the optical low-pass filter 410, the piezoelectric element 430 is bonded and retained (cemented to be fixed) so that the longer edge of the piezoelectric element 430 becomes parallel to the shorter edge (side edge) of the optical low-pass filter 410. The piezoelectric element 430 corresponds to the vibration unit of the present invention.

The piezoelectric element 430 is cemented on the optical low-pass filter 410 so that the piezoelectric element 430 comes close to one of four edges of the optical low-pass filter 410 and in parallel to the one edge of the optical low-pass filter 410. The piezoelectric element 430 applies wave-like vibration to the optical low-pass filter 410 so that a plurality of nodes parallel to the one edge may be provided.

A retaining member 610, which is made of a resin or metal material, has an opening 610a having an approximately rectangular shape. In addition, the retaining member 610 retains the image sensor unit 33a on the photographer (image) side. Furthermore, on the object side, the retaining member 610 retains the optical low-pass filter 410. To the retaining member 610, a first sealing member 620 is integrally provided on the photographer side while a second sealing member 630 is also integrally provided on the object side.

The sealing members 620 and 630 are elastic members. It is useful if the sealing members 620 and 630 are made of an elastomer. However, the present exemplary embodiment is not limited to this. More specifically, it is also useful if the sealing members 620 and 630 are made of high molecular polymer, such as polyurethane foam or plastic. In the present exemplary embodiment, the sealing members 620 and 630 are integrally formed on the retaining member 610 as described above. However, it is also useful if the sealing members 620 and 630 are provided separately from the retaining member 610.

The image sensor unit 33a is in close contact with the first sealing member 620 in a clearance against the retaining member 610. On the other hand, at a position different from the close-contact position, the image sensor unit 33a is fixed onto the retaining member 610 by using a screw 500.

The optical low-pass filter 410 is in close contact with the second sealing member 630 in a clearance against the retaining member 610. A pushing member 440 is fixed onto the retaining member 610 by using a screw 510. The pushing member 440, which contacts the optical low-pass filter 410 at four locations outside the effective shooting area 410a, presses the optical low-pass filter 410 towards the photographer side in the direction of the optical axis.

An optical member 460 includes a phase plate (a depolarization board), infrared-ray cut filter, and a birefringent plate, whose direction of refraction is different from that of the optical low-pass filter 410 by 90°, bonded to each other. More specifically, the optical member 460 is bonded and fixed onto the retaining member 610 so as to seal the opening portion 610a.

A flexible-printed circuit board 470 for piezoelectric element applies voltage on the piezoelectric element 430. The flexible-printed circuit board 470 is bonded and fixed on the piezoelectric element 430. The piezoelectric element 430 expands and contracts to vibrate primarily in a direction perpendicular to the optical axis when voltage is applied thereto, and causes the optical low-pass filter 410 to resonate (vibrate). With the vibration applied to the optical low-pass filter 410, foreign matters that have adhered to the surface of the optical low-pass filter 410 can be removed by the vibration.

With the above-described configuration, the optical low-pass filter 410 is pinched and supported between the pushing member 440 and the second sealing member 630 to freely vibrate.

<A2-3. Configuration of the Piezoelectric Element (FIG. 6)>

Referring to FIG. 6, a surface B of the piezoelectric element 430 is divided into a "+phase" and a "G phase", which are provided to excite standing wave vibration on the optical low-pass filter 410. A surface C of the piezoelectric element 430 is electrically connected via a conductive material (not illustrated). Accordingly, the surface C of the piezoelectric element 430 has the same potential as that of the surface B.

On the surface B, the flexible-printed circuit board 470 for piezoelectric element is fastened by bonding so that a predetermined voltage can be applied separately to each of the + phase and the G phase. The surface C is fixed onto the optical low-pass filter 410 by bonding so that the piezoelectric element 430 and the optical low-pass filter 410 uniformly move.

<A2-4. Configuration of the Sealing Member (FIG. 7)>

Figure 7A:
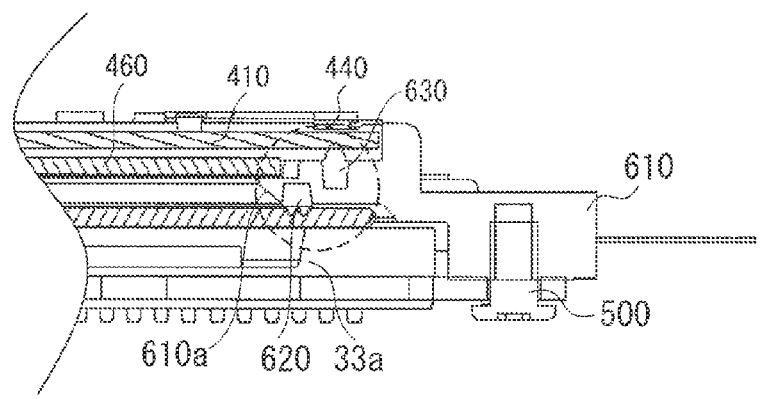
FIGS. 7A and 7B illustrate an example of each of a retaining member and a sealing member included in the image pickup unit according to the first exemplary embodiment of the present invention.
Figure 7B:
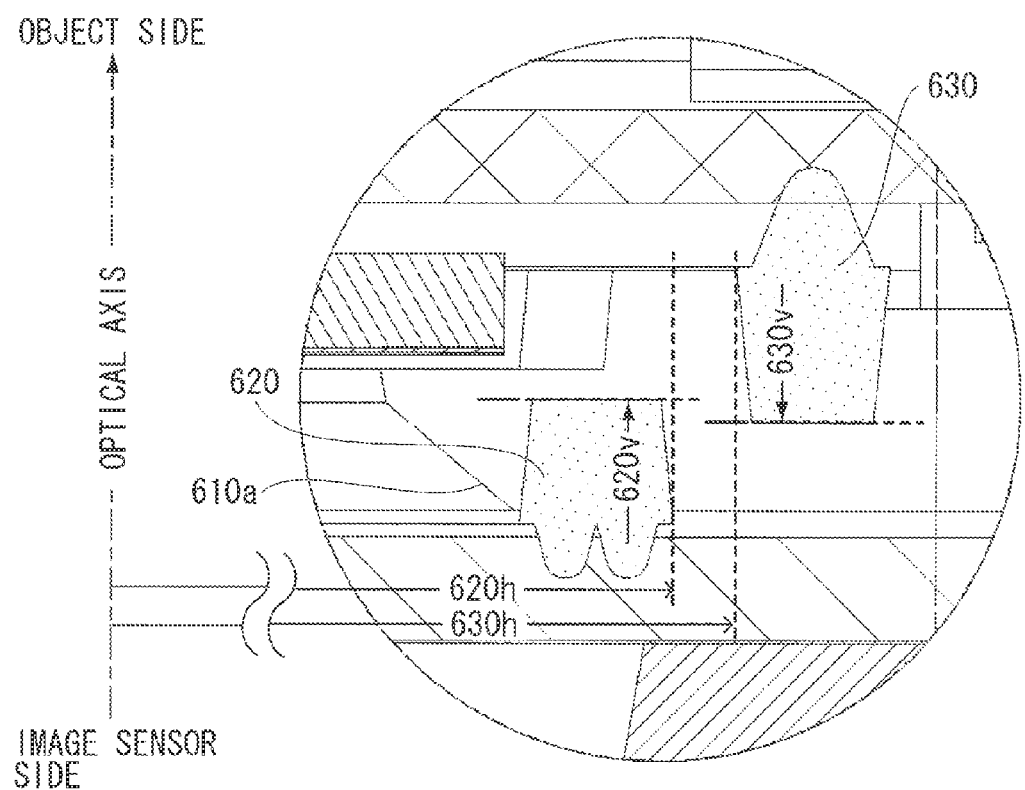

Now, an exemplary configuration of the retaining member 610 and the sealing members 620 and 630 will be described in detail below with reference to FIGS. 7A and 7B. FIG. 7A is a cross section A-A in FIG. 4. FIG. 7B is an enlarged view of a portion surrounded by a broken circle illustrated in FIG. 7A.

The first sealing member 620 is provided to surround the opening 610a of the retaining member 610 on the photographer side. The first sealing member 620 is integrally formed on the retaining member 610 by molding. The surface of the first sealing member 620 on the photographer side contacts the image sensor unit 33a. The first sealing member 620 is an elastic member, such as an elastomer. The first sealing member 620 can be integrally formed with the retaining member 610 by coinjection molding.

The image sensor unit 33a is completely fixed on the retaining member 610 by using the screw 500. In this state, the first sealing member 620 is pressed by the retaining member 610 and the image sensor unit 33a at a predetermined interval and is elastically deformed. Thus, the first sealing member 620 can seal the image sensor unit 33a.

The contact portion of the first sealing member 620 with the image sensor unit 33a has at least one convex shape portion. In addition, the optical member 460 is retained by a predetermined retaining portion of the retaining member 610 by bonding or fusing. Accordingly, the space surrounded by the retaining member 610, the image sensor unit 33a, the first sealing member 620, and the optical member 460 is sealed. Thus, a closely sealed space, for which foreign matters, such as dusts, are prevented from entering, is formed.

On the other hand, the second sealing member 630 is provided to surround the opening 610a of the retaining member 610 on the object side. The second sealing member 630 is also integrally formed on the retaining member 610 by molding. The surface of the second sealing member 630 on the object side contacts the optical low-pass filter 410.

The optical low-pass filter 410 is pressed against the image sensor unit 33a by the elasticity of the pushing member 440. Therefore, being pressed by the pushing member 440 and the retaining member 610, the second sealing member 630 is elastically squashed and deformed. Accordingly, the space surrounded the optical low-pass filter 410, the retaining member 610, the second sealing member 630, and the operation member 460 is sealed. Thus, a closely sealed space, for which foreign matters, such as dusts, are prevented from entering, is formed.

The optical low-pass filter 410 and the second sealing member 630 also function as a vibration transmission member for transmitting the vibration generated by the piezoelectric element 430. With the vibration transmitted via the optical low-pass filter 410 and the second sealing member 630, foreign matters that have adhered to the surface of the optical low-pass filter 410 can be removed.

Now, an exemplary arrangement of the first sealing member 620 and the second sealing member 630 will be described in detail below. Referring to FIG. 7B, the first sealing member 620 is disposed with an offset from the second sealing member 630 in the direction normal to the optical axis.

In addition, within a plane parallel to the direction of the optical axis, clearance is provided between a side 620h of the first sealing member 620 and a side 630h of the second sealing member 630. The side 620h of the first sealing member 620 is an external side thereof viewed from the optical axis. The side 630h of the second sealing member 630 is an internal side thereof viewed from the optical axis. In other words, within the plane parallel to the direction of the optical axis, the first sealing member 620 and the second sealing member 630 are not overlapped with external apparatus.

In order to efficiently cause the optical low-pass filter 410 to be vibrated, it is useful to arrange the second sealing member 630 so that the second sealing member 630 holds the position of the node of the vibration mode of the optical low-pass filter 410. Therefore, the second sealing member 630 is to be arranged according to the unique vibration mode of the optical low-pass filter 410. Accordingly, the second sealing member 630 may not be freely arranged.

On the other hand, the first sealing member 620, which functions to seal the retaining member 610 and the image sensor unit 33a, can be relatively freely arranged. Therefore, if the first sealing member 620 is arranged with an offset from the second sealing member 630 towards the optical axis, the size of the retaining member 610 is determined by the size of the second sealing member 630. Accordingly, the area projected on the plane horizontal to the optical axis can be made minimum.

In addition, in relation to the direction of the optical axis, a bottom surface 630v of the second sealing member 630 is more protruded towards the image sensor unit 33a than a bottom surface 620v of the first sealing member 620 is. As described above, in the present exemplary embodiment, the first sealing member 620 and the second sealing member 630 are mutually overlapped in the direction normal to the optical axis. Accordingly, the thickness of the image pickup unit 400 in the direction of the optical axis can be reduced.

<A2-5. Method for Disassembling and Reassembling the Image Pickup Unit (FIGS. 8 and 9)>

As described above, in the present exemplary embodiment, the retaining member 610, the optical low-pass filter 410, the operation member 460, and the image sensor unit 33a form a closely sealed space. However, although the space is closely sealed, intrusion of foreign matters may not be always prevented during assembly of the image pickup unit 400.

Accordingly, if any intruded foreign matter is detected by detection executed after completely assembling the image pickup unit 400, disassembling the image pickup unit 400 to remove the image pickup unit 400 therefrom and reassembling the image pickup unit 400 are to be performed.

Figure 8A:
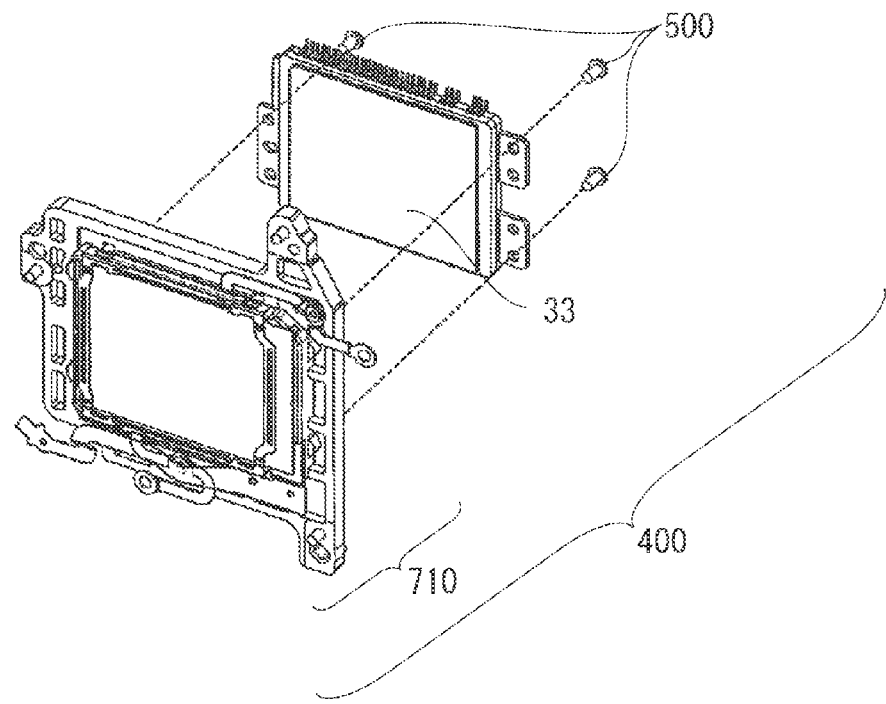
FIGS. 8A and 8B are exploded perspective diagrams illustrating an example of an image sensor unit included in the image pickup unit according to the first exemplary embodiment of the present invention.
Figure 8B:
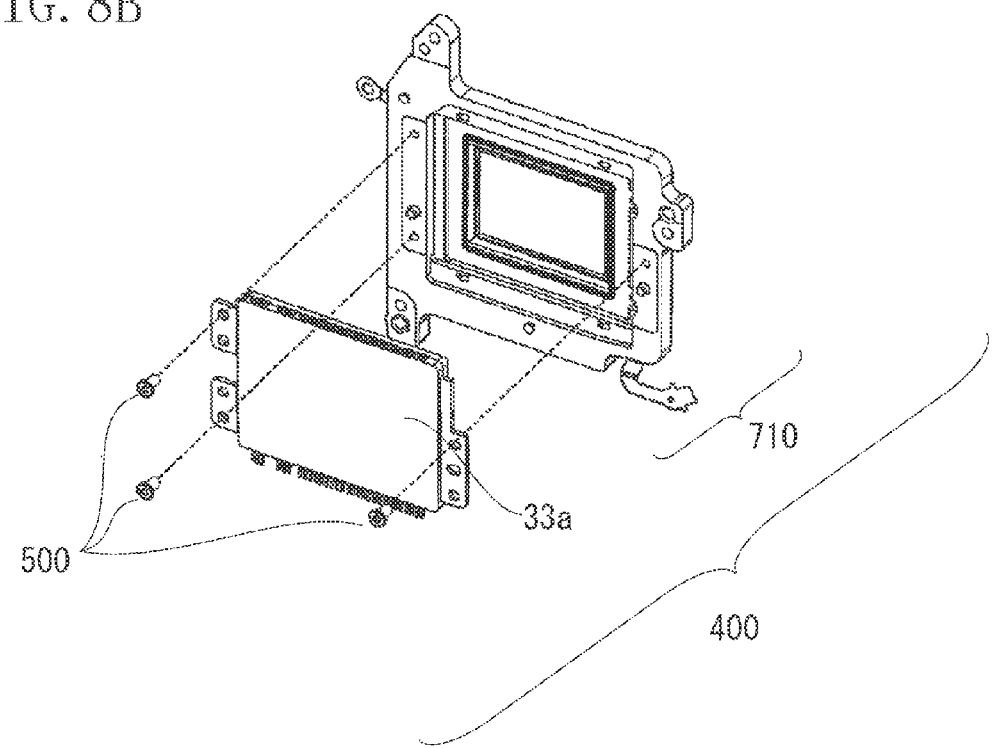

Now, an exemplary method for disassembling and reassembling the image pickup unit 400 according to the present exemplary embodiment will be described in detail below with reference to FIGS. 8A, 8B, 9A, and 9B. Referring to FIGS. 8A and 8B, a component 710 is a unit where the image sensor unit 33a is dismounted from the image pickup unit 400.

In the present exemplary embodiment, the closely sealed space is formed by the first sealing member 620. Accordingly, the image sensor unit 33a can be dismounted only by unscrewing the screw 500. Meanwhile, in the above-described conventional method, an image sensor unit and an optical element unit are closely fixed with each other by using an adhesive sheet. Accordingly, in the above-described conventional method, various situations may arise, such that the optical element and a retaining member may be damaged when the adhesive sheet is peeled off during rework or that the peeled adhesive sheet may not be reused.

Different from the conventional method, according to the present invention having the above-described configuration, the image pickup unit 400 can be easily disassembled and reassembled. Furthermore, if any foreign matters have intruded the image pickup unit 400, the foreign matters can be easily removed from the image pickup unit 400 according to the present exemplary embodiment.

Figure 9A:
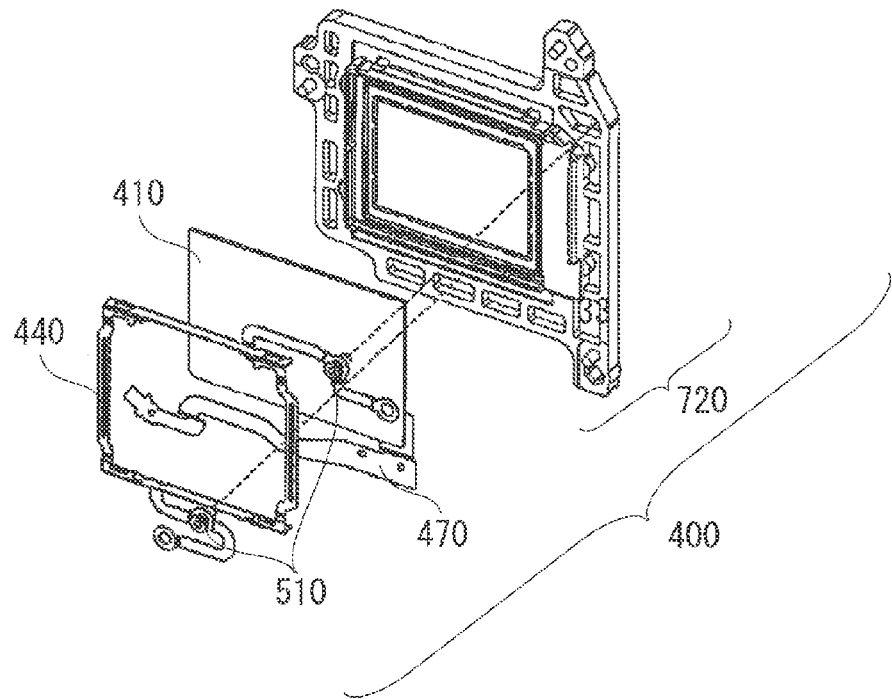
FIGS. 9A and 9B are exploded perspective diagrams illustrating an example of an optical low-pass filter included in the image pickup unit according to the first exemplary embodiment of the present invention.
Figure 9B:
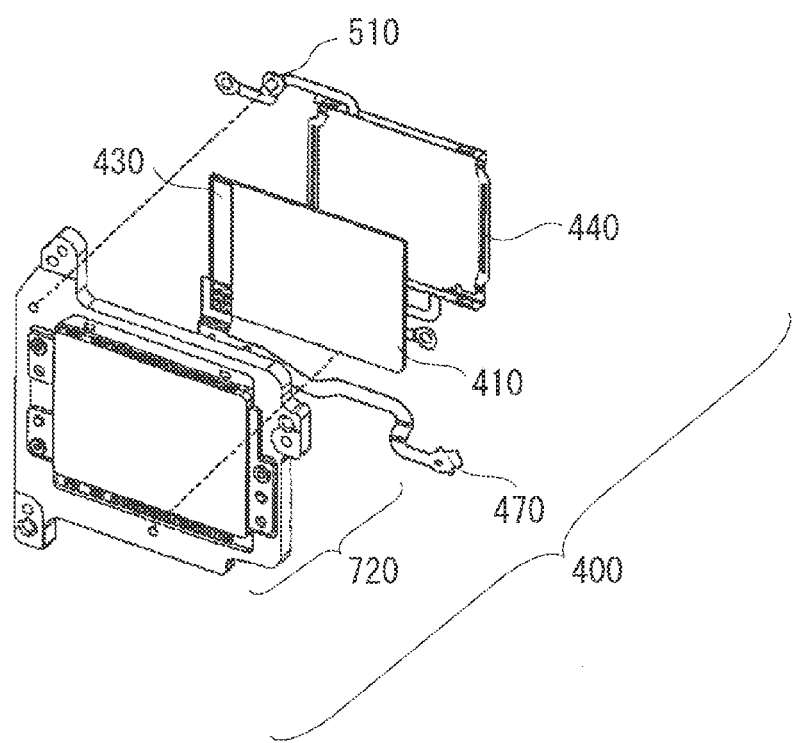

Referring to FIGS. 9A and 9B, a component 720 is a unit where the pushing member 440, the optical low-pass filter 410, the piezoelectric element 430, and the flexible-printed circuit board 470 are dismounted from the image pickup unit 400.

With the above-described configuration, if any foreign matters that have entered the second sealing member 630 and the optical low-pass filter 410 are found, the closely sealed space can be cleaned again only by dismounting the pushing member 440. According to the present exemplary embodiment having the configuration described above, it is enabled to easily disassemble, clean, and reassemble the image pickup unit 400 if any foreign matters entering the closely sealed space of the image pickup unit 400 is found during assembly thereof. Accordingly, the present exemplary embodiment can improve the workability of the image pickup unit 400.

<A3. Operation for Removing Foreign Matters (FIG. 10)>

Now, an exemplary operation for removing foreign matters, such as dusts, from the surface of the optical low-pass filter 410 will be described in detail below with reference to FIG. 10.

Figure 10:
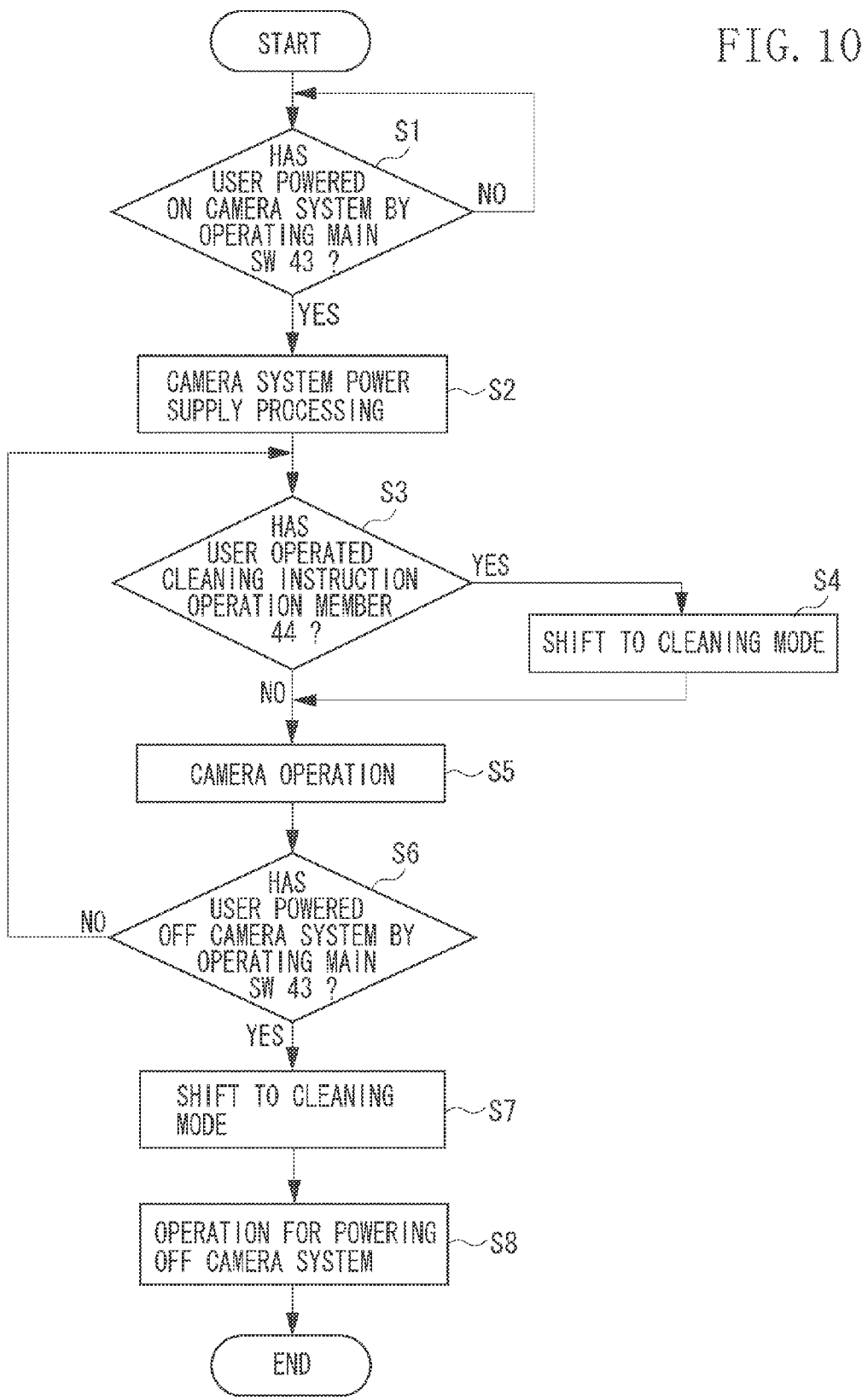
FIG. 10 is a flow chart illustrating an example of processing for removing foreign matters, such as dusts, that have adhered to a surface of the optical low-pass filter.

Referring to FIG. 10, in step S1, the MPU 100 determines whether the photographer (user) has pressed the main switch 43 to power on the camera. If it is determined that the camera has been powered on (YES in step S1), then the processing proceeds to step S2. In step S2, the MPU 100 executes processing for starting the camera system. More specifically, in step S2, the MPU 100 executes control of the power supply circuit 110 for supplying power to each circuit to initialize the system. In addition, the MPU 100 in step S2, the MPU 100 executes control for executing a camera system ON operation. In the present exemplary embodiment, a "camera system ON operation" is an operation for shifting to a shooting operation mode of the camera.

In step S3, the MPU 100 determines whether the photographer has operated the cleaning instruction operation member 44. If it is determined that the photographer has operated the cleaning instruction operation member 44 (YES in step S3), then the processing proceeds to step S4. On the other hand, if it is determined that the photographer has not operated the cleaning instruction operation member 44 (NO in step S3), then the processing proceeds to step S5.

As described above, the camera according to the present exemplary embodiment includes the cleaning instruction operation member 44. However, the present invention is not limited to this. More specifically, in the present exemplary embodiment, an operation member for instructing the shift to the cleaning mode is not limited to hardware, such as a mechanical button. In other words, it is also useful if the shift to the cleaning mode is instructed by operating a cursor key or an instruction button (i.e., a soft key) from a menu displayed on the color liquid crystal monitor 19, instead of using a hard key.

In step S4, the MPU 100 changes the operation mode of the camera body 1 (the camera) to the cleaning mode according to a command for starting the cleaning mode. More specifically, in step S4, the power supply circuit 110 supplies power used to execute the cleaning mode operation to each component of the camera body 1. In parallel to this, the power supply circuit 110 detects the amount of power remaining in the power source unit 42 and transmits a result of the remaining power detection to the MPU 100.

After receiving a signal for starting the cleaning mode, the MPU 100 transmits a driving signal to the piezoelectric element driving circuit 111. After receiving the driving signal from the MPU 100, the piezoelectric element driving circuit 111 generates a periodic voltage for exciting the standing wave vibration on the optical low-pass filter 410. In addition, the piezoelectric element driving circuit 111 applies the generated periodic voltage to the piezoelectric element 430.

The periodic voltage varies within a frequency of a specific range, including a frequency at which the standing wave is excited. The piezoelectric element 430 expands and contracts according to the voltage applied thereto, and generates the standing wave vibration on the optical low-pass filter 410.

After the operation in the cleaning mode ends, the processing proceeds to step S5. In step S5, the MPU 100 receives a signal from various switches and dials, such as the SW1 7a, the SW2 7b, the main operation dial 8, the sub operation dial 20, the shooting mode setting dial 14, and executes a camera operation. A "camera operation" is a publicly known mode for executing a shooting operation and a setting operation of the camera. Accordingly, the camera operation will not be described in detail in the present exemplary embodiment.

In step S6, the MPU 100 determines whether the camera has been powered off by operating the main switch 43 in the standby mode of the camera. If it is determined that the camera has been powered off by operating the main switch 43 in the standby mode (YES in step S6), then the processing proceeds to step S7. On the other hand, if it is determined that the camera has not been powered off yet (NO in step S6), then the processing returns to step S3.

In step S7, the MPU 100 executes the cleaning mode similar to that in step S4. Then the processing proceeds to step S8. In the cleaning mode in step S7, in order to reduce the power consumed on the camera and the time taken for the operation, it is useful to use parameters, such as the driving frequency for driving the piezoelectric element 430, the time of driving the piezoelectric element 430, and the method for controlling the piezoelectric element 430, different from those described in step S4.

In step S8, the MPU 100 executes control for discontinuing the supply of power to each circuit. In addition, in step S8, the MPU 100 stores necessary information on the EEPROM 100a. Furthermore, the MPU 100 executes control of the power supply circuit 110 for executing a power off operation for discontinuing the supply of power to each circuit.

As described above, in the present exemplary embodiment, the MPU 100 executes the cleaning mode not only at an arbitrary timing desired by the photographer but also when the camera is powered off. More specifically, in the present exemplary embodiment, the MPU 100 executes the camera system off operation after executing the operation for removing foreign matters from the surface of the optical low-pass filter 410.

Meanwhile, various types of foreign matters may adhere to the surface of the optical low-pass filter 410. The inventor has found by experiment that if the foreign matters that have adhered to the surface of the optical low-pass filter 410 are left unremoved for a long period of time, it becomes difficult to remove the foreign matters left unremoved for a long period of time even if vibration is applied to the optical low-pass filter 410 by executing the cleaning mode. This is due to an increase in the adhesive force, such as the liquid cross-linking force, which may occur due to condensation caused by the environmental change in the temperature or the humidity. The above-described phenomenon of difficulty in removing long-unremoved foreign matters from the optical low-pass filter 410 may occur due to the increase in the adhesive force caused by repeated swelling and drying of dusts (the foreign matters) that may occur because of the change in the environment of storage or use of the camera.

If an elastic material, such as rubber, is used, oil and fat content included in the elastic material may bleed and increases the adhesive force of the material. Accordingly, it is more useful, efficient, and effective to execute the cleaning mode at the timing of powering off the camera, after which the camera may be left unoperated for a long period of time, than to execute the cleaning mode at the timing of powering on the camera, which is a timing after the camera is left unoperated for a long period of time and thus it may have become difficult to remove the foreign matters from the optical low-pass filter 410.

In addition, in the present exemplary embodiment, the MPU 100 executes the cleaning mode when the photographer executes the operation for powering off the camera by operating the main switch 43. However, the present exemplary embodiment is not limited to this. More specifically, it is also useful if the MPU 100 executes the camera system off operation, which is similar to the operation for powering off the camera, after a predetermined time period has elapsed in the camera power "ON" state. In this case also, the effect of the present invention can be achieved if the MPU 100 executes the cleaning mode previously to the timing of executing the camera system off operation.

In the present exemplary embodiment, the optical low-pass filter 410 is used as the optical member. However, the present invention is not limited to this. More specifically, it is also useful if the birefringent plate is made of lithium niobate instead of crystal.

It is also useful if an optical low-pass filter is vibrated, which includes a birefringent plate, a phase plate, and an infrared-ray cut filter cemented together. Alternatively, it is also useful if the infrared-ray cut filter only is vibrated, instead of the optical low-pass filter. Further alternatively, it is also useful if a glass plate only is vibrated, which is disposed in front of the birefringent plate, instead of vibrating the optical low-pass filter.

Figure 11:
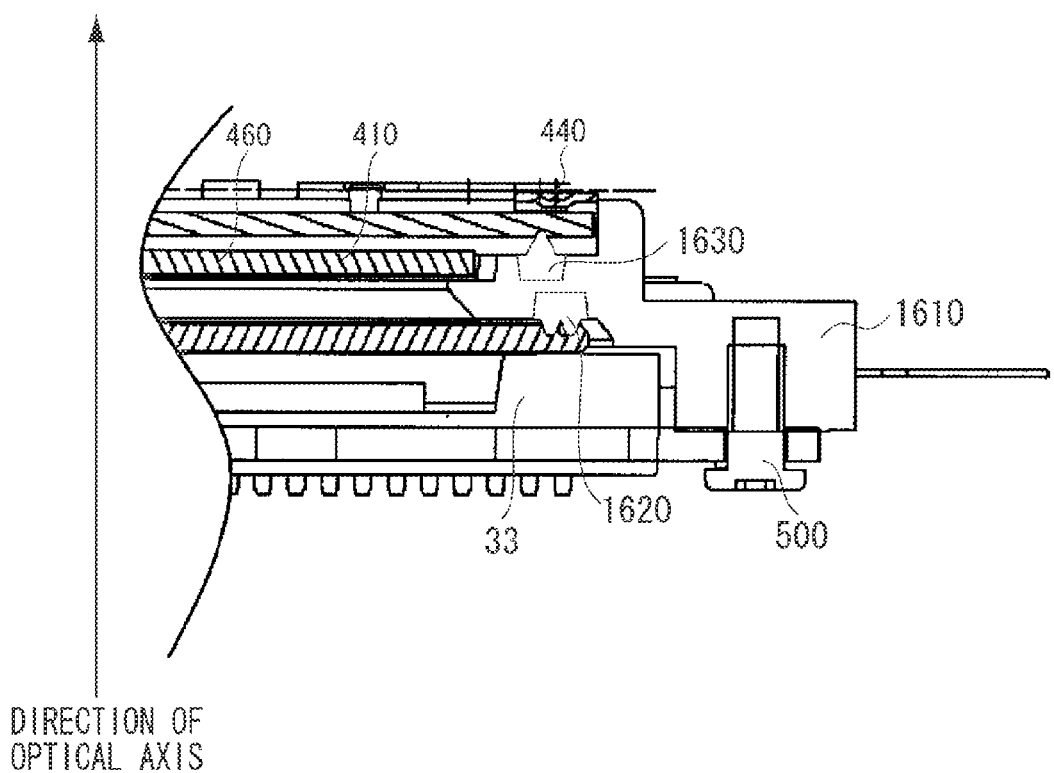
FIG. 11 illustrates a modification of the first exemplary embodiment of the present invention.

FIG. 11 illustrates a modification of the first exemplary embodiment of the present invention. More specifically, FIG. 11 is a cross section of an image pickup unit on the same section of the image pickup unit 400 as illustrated in FIG. 7. The exemplary embodiment according to the first exemplary embodiment illustrated in FIG. 7 and the modification of the first exemplary embodiment illustrated in FIG. 11 has the following difference. More specifically, in the modification illustrated in FIG. 11, the positional relationship between a first sealing member 1620 and a second sealing member 1630, which are provided on a retaining member 1610, is different from the positional relationship between the first sealing member 620 and the second sealing member 630 provided on the retaining member 610 in the image pickup unit 400 according to the first exemplary embodiment.

In the image pickup unit illustrated in FIG. 11, which is a second exemplary embodiment of the present invention, components, units, or portions similar to those of the first exemplary embodiment are provided with the same reference numerals and symbols.

Now, the retaining member 1610, the first sealing member 1620, and the second sealing member 1630 will be described in detail below with reference to FIG. 11. Referring to FIG. 11, the first sealing member 1620 is integrally formed on the retaining member 1610. In addition, the first sealing member 1620 contacts the image sensor 33.

The first sealing member 1620 is an elastic member, such as rubber or an elastomer. The first sealing member 1620 can be integrally formed with the retaining member 1610 by coinjection molding. The image sensor 33 is completely fixed on the retaining member 1610 by using the screw 500.

The first sealing member 1620 is pressed between the retaining member 1610 and the image sensor 33 with constant pressure. Thus, the first sealing member 1620 is elastically deformed. Accordingly, the first sealing member 1620 can closely seal the space on the image area side. The portion of the first sealing member 1620 contacting the image sensor 33 has a convex shape.

In addition, the optical member 460 is bonded onto a predetermined retaining portion of the retaining member 1610 at an outer periphery thereof to be retained by the retaining member 1610. With this configuration, the space surrounded by the retaining member 1610, the image sensor 33, the first sealing member 1620, and the operation member 460 is sealed. Thus, a closely sealed space, into which foreign matters, such as dusts, are prevented from entering, is formed.

On the other hand, the second sealing member 1630 is also integrally formed on the retaining member 1610 by molding. The surface of the second sealing member 1630 on the object side contacts the optical low-pass filter 410. The optical low-pass filter 410 is pressed by the elasticity of the pushing member 440 against the image sensor 33. Therefore, the second sealing member 1630 is elastically deformed. Accordingly, the second sealing member 1630 closely contacts the optical low-pass filter 410 and the retaining member 610.

With this configuration, the space surrounded by the optical low-pass filter 410, the retaining member 1610, the second sealing member 1630, and the operation member 460 is sealed. Thus, a closely sealed space, into which foreign matters, such as dusts, are prevented from entering, is formed.

However, the present invention is not limited to this. More specifically, it is also useful if the optical low-pass filter 410 and the second sealing member 1630 are made of an elastic material and also function as vibration transmission members for transmitting the vibration generated by a vibration generation member.

As illustrated in FIG. 11, the first sealing member 1620 and the second sealing member 1630 are provided so that the first sealing member 1620 and the second sealing member 1630 are overlapped with each other in the direction of the optical axis.

Now, a digital single lens reflex camera according to the second exemplary embodiment of the present invention will be described in detail below with reference to FIGS. 12 through 16.

<B1. Outline Configuration of the Camera>

The digital single-lens reflex camera according to the present exemplary embodiment has an outline configuration similar to that described above in the first exemplary embodiment with reference to FIGS. 1 through 3. Accordingly, the description thereof will not be repeated here. In FIGS. 12 through 16, components, units, and portions similar to those of the first exemplary embodiment are provided with the same reference numerals and symbols.

<B2. Specific Configuration of the Image Pickup Unit (FIGS. 12 through 16)>

<B2-1. Outline Configuration of the Image Pickup Unit Included in the Camera>

Now, an exemplary outline configuration of an image pickup unit 2400 according to the present exemplary embodiment will be described in detail below with reference to FIG. 12.

Figure 12:
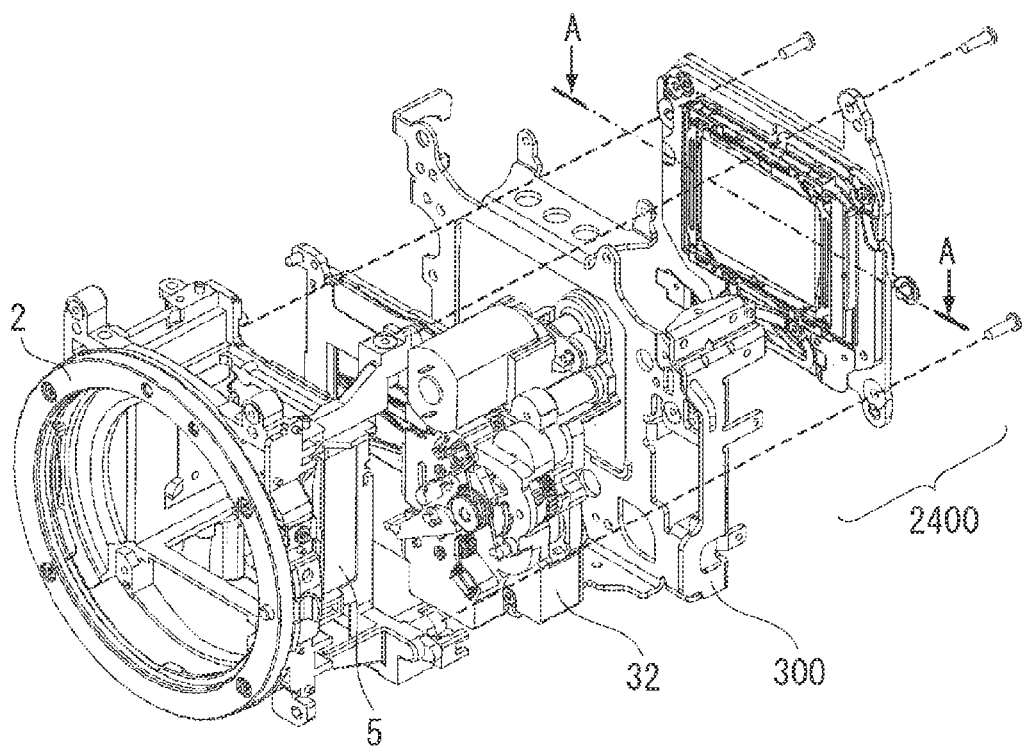
FIG. 12 is an exploded perspective diagram illustrating an exemplary inner configuration of the camera, which primarily illustrates an exemplary configuration for retaining an image pickup unit included in the camera according to a second exemplary embodiment of the present invention.

Referring to FIG. 12, on the object side of the camera chassis 300, which functions as a skeletal frame of the camera body 1, the mirror box 5 and the shutter unit 32 are provided in this order from the object side to the image side. On the photographer side of the camera chassis 300, the image pickup unit 2400 is provided. For the image pickup unit 2400, the image plane of the image sensor 33 is fixed onto a mounting surface of the mounting portion 2, which surface is the criterion of mounting the photographic lens unit, in such a manner that the image plane of the image sensor 33 is parallel to the mounting surface of the mounting portion 2 at a predetermined clearance.

<A2-2. Configuration of the Image Pickup Unit (FIGS. 13A and 13B)>

Figure 13A:
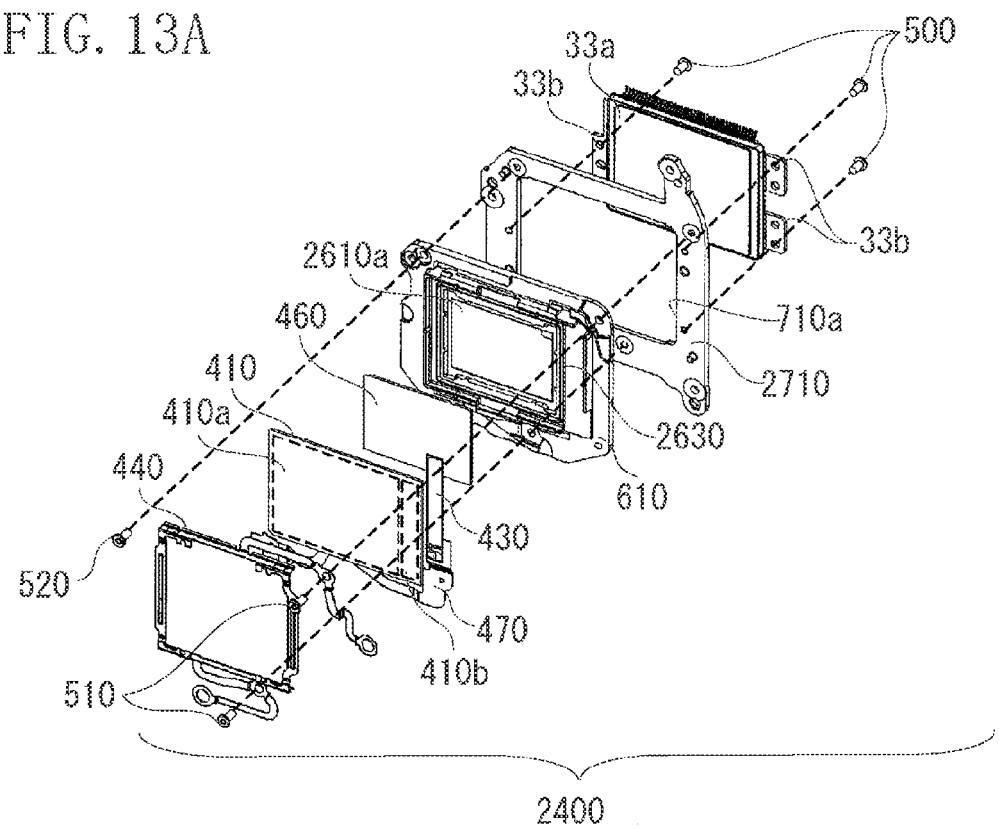
FIGS. 13A and 13B are exploded perspective diagrams illustrating an exemplary configuration of an image pickup unit according to the second exemplary embodiment of the present invention.
Figure 13B:
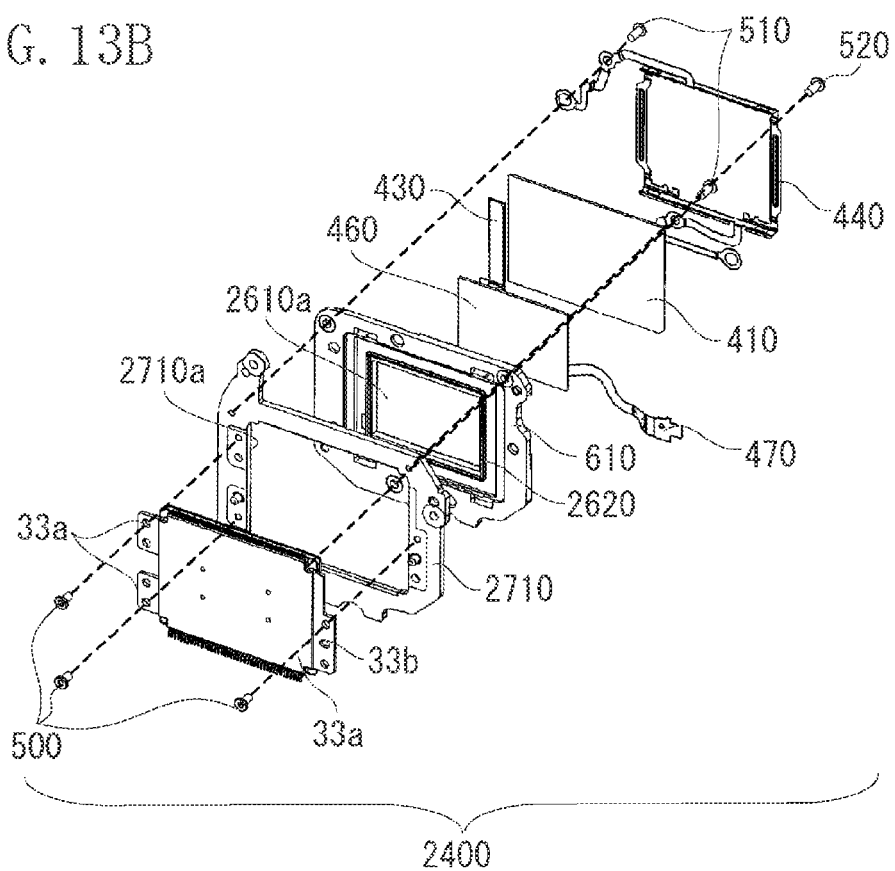

FIG. 13A is a perspective diagram illustrating an example of the image pickup unit 2400 according to the present exemplary embodiment viewed from the object side. FIG. 13B is a perspective diagram illustrating an example of the image pickup unit 2400 according to the present exemplary embodiment viewed from the photographer side.

Referring to FIGS. 13A and 13B, the optical low-pass filter 410 is one piece of birefringent plate made of crystal. The optical low-pass filter 410 has a rectangular shape. The optical low-pass filter 410 corresponds to an optical member of the present invention.

The optical low-pass filter 410 has a peripheral portion 410b, which is provided on one edge portion of an effective shooting area 410a. The piezoelectric element 430 is provided on the peripheral portion 410b. The optical low-pass filter 410 is asymmetric in a direction perpendicular to the center of the imaging optical axis (i.e., in a horizontal direction of the camera). The surface of the optical low-pass filter 410 having the above-described configuration is optically coated.

The piezoelectric element 430 is a single plate having a strip-like shape. On the peripheral portion 410b of the optical low-pass filter 410, the piezoelectric element 430 is bonded and retained (cemented to be fixed) so that the longer edge of the piezoelectric element 430 becomes parallel to the shorter edge (side edge) of the optical low-pass filter 410.

The piezoelectric element 430 corresponds to a vibration unit of the present invention. The piezoelectric element 430 is cemented on the optical low-pass filter 410 so that the piezoelectric element 430 comes close to one of four edges of the optical low-pass filter 410 and in parallel to the one edge of the optical low-pass filter 410. The piezoelectric element 430 applies wave-like vibration to the optical low-pass filter 410 so that a plurality of nodes parallel to the one edge may be provided.

An optical member retaining member 2610, which implements a first retaining member of the present invention, is made of a resin or metal material. The optical member retaining member 2610 has an opening 2610a, which has an approximately rectangular shape. With the above-described configuration, the optical member retaining member 2610 retains the optical low-pass filter 410 and the optical member 460. On the optical member retaining member 2610, a first sealing member 2620 is integrally formed on the photographer side. In addition, a second sealing member 2630 is also integrally formed on the optical member retaining member 2610 on the object side.

The sealing members 2620 and 2630 are elastic members. It is useful if the sealing members 2620 and 2630 are made of rubber or an elastomer. However, the present exemplary embodiment is not limited to this. More specifically, it is also useful if the sealing members 2620 and 2630 are made of high molecular polymer, such as polyurethane foam or plastic. In the present exemplary embodiment, the sealing members 2620 and 2630 are integrally formed on the optical member retaining member 2610 as described above. However, it is also useful if the sealing members 2620 and 2630 are provided separately from the optical member retaining member 2610.

The optical member 460 includes a phase plate (a depolarization board) and a birefringent plate, whose direction of refraction is different from that of the optical low-pass filter 410 by 90°, bonded to each other. More specifically, the optical member 460 is bonded and fixed onto the optical member retaining member 2610 so as to seal an opening portion 2610*a*.

An image sensor retaining member 2710, which implements a second retaining member of the present invention, has an opening 2710*a* having an approximately rectangular shape. In addition, the image sensor retaining member 2710 retains the image sensor unit 33*a* on the photographer side. Furthermore, on the object side, the image sensor retaining member 2710 retains the optical member retaining member 2610.

The image sensor unit 33*a* is fixed on the image sensor retaining member 2710 by using the screw 500. For the material of the image sensor retaining member 2710, resin or metal can be used. If the image sensor retaining member 2710 is made of a metal material, the image sensor retaining member 2710 can have a high effect of lowering the heat generated on the image sensor 33. In this case, the image sensor retaining member 2710 is useful in preventing image degradation that may otherwise occur due to high heat generated on the image sensor 33.

The pushing member 440, which contacts the optical low-pass filter 410 at four locations outside the effective shooting area 410*a*, presses the optical low-pass filter 410 towards the photographer side in the direction of the optical axis. The pushing member 440 and the optical member retaining member 2610 are fixedly mounted on the image sensor retaining member 2710 by using a screw 510.

In addition, the optical member retaining member 2610 is also fixed onto the image sensor retaining member 2710 by using a screw 520. With the above-described configuration, the optical low-pass filter 410 is caused by the second sealing member 2630 to come into close contact with the optical member retaining member 2610. Furthermore, the image sensor unit 33*a* closely contacts the first sealing member 2620 of the optical member retaining member 2610 in the above-described manner.

With the above-described configuration, the optical low-pass filter 410 is pinched and supported between the pushing member 440 and the second sealing member 2630 to freely vibrate.

The flexible-printed circuit board 470 for piezoelectric element applies voltage on the piezoelectric element 430. The flexible-printed circuit board 470 is bonded and fixed on the piezoelectric element 430. The piezoelectric element 430 expands and contracts to vibrate primarily in a direction perpendicular to the optical axis when voltage is applied thereto, and causes the optical low-pass filter 410 to resonate (vibrate). With the vibration applied to the optical low-pass filter 410, foreign matters that have adhered to the surface of the optical low-pass filter 410 can be removed by the vibration.

<B2-3. Configuration of the Piezoelectric Element>

In the present exemplary embodiment, the piezoelectric element 430 has a configuration similar to that of the piezoelectric element 430 described above in the first exemplary embodiment with reference to FIG. 6. Accordingly, the detailed description thereof will not be repeated here.

<B2-4. Configuration of the Sealing Member (FIG. 14)>

Figure 14:
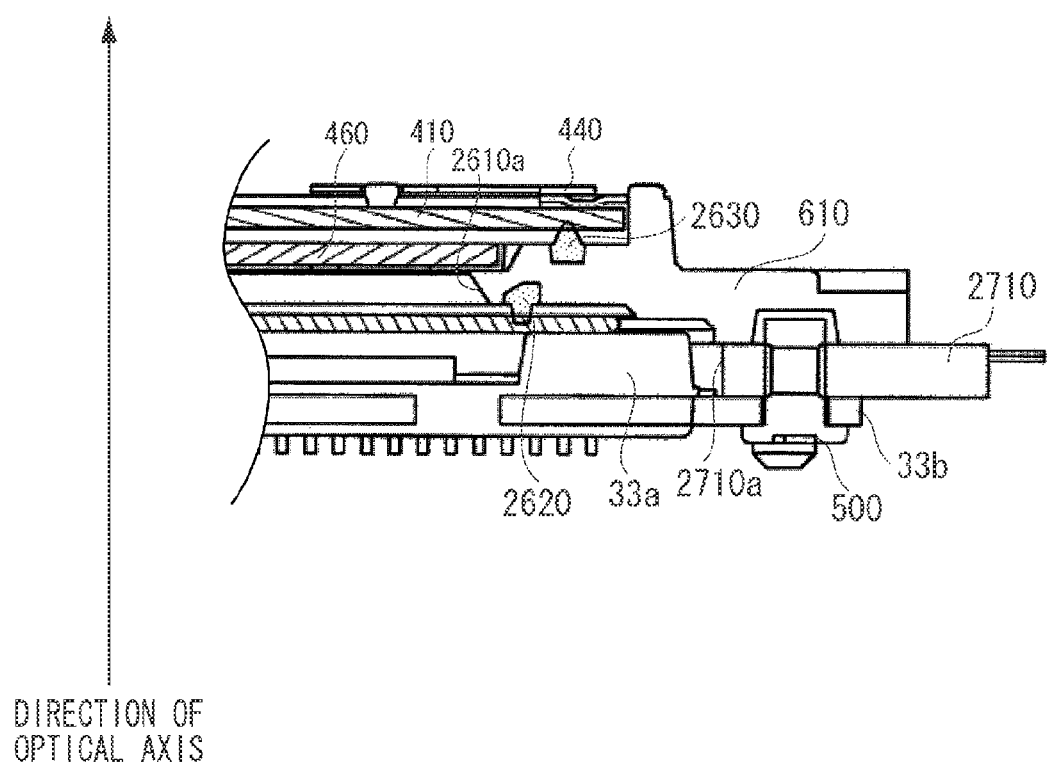
FIG. 14 illustrates an example of each of a retaining member and a sealing member included in the image pickup unit according to the second exemplary embodiment of the present invention.

Now, an exemplary configuration of the optical member retaining member 2610 and the sealing members 2620 and 2630 will be described in detail below with reference to FIG. 14. FIG. 14 is a cross section A-A illustrated in FIG. 12.

The first sealing member 2620 is provided to surround the opening portion 2610*a* of the optical member retaining member 2610 on the photographer side. The first sealing member 2620 is integrally formed on the optical member retaining member 2610 by molding. The surface of the first sealing member 2620 on the photographer side contacts the image sensor unit 33*a*.

The first sealing member 2620 is an elastic member, such as rubber and elastomer. The first sealing member 2620 can be integrally formed with the optical member retaining member 2610 by coinjection molding.

The image sensor unit 33*a* is fixedly mounted onto the image sensor retaining member 2710 by using the screw 500 at a screw fixation portion 33*b*. With the configuration such that the image sensor unit 33*a* is fixedly mounted on the image sensor retaining member 2710 in the above-described manner by using the screw 500, the first sealing member 2620 is elastically deformed until the clearance between the optical member retaining member 2610 and the image sensor unit 33*a* reaches a predetermined clearance. With the above-described configuration, the space on the side of the image sensor unit 33*a* can be closely sealed.

The section of the portion of the first sealing member 2620 contacting the image sensor unit 33*a* has at least one convex shape portion. In addition, the optical member 460 is retained by a predetermined retaining portion of the optical member retaining member 2610 by bonding at its outer periphery. Accordingly, the space surrounded by the optical member retaining member 2610, the image sensor unit 33*a*, the first sealing member 2620, and the optical member 460 is sealed. Thus, a closely sealed space, for which foreign matters, such as dusts, are prevented from entering, is formed.

On the other hand, the second sealing member 2630 is provided to surround the opening 2610*a* of the optical member retaining member 2610 on the object side. The second sealing member 2630 is provided with an offset from the first sealing member 2620 in the direction away from the optical axis (i.e., towards the outside of the image pickup unit). The second sealing member 2630 is also integrally formed on the optical member retaining member 2610 by molding. The surface of the second sealing member 2630 on the object side contacts the optical low-pass filter 410.

The optical low-pass filter 410 is pressed against the image sensor unit 33*a* by the elasticity of the pushing member 440. Therefore, being pressed by the pushing member 440, the second sealing member 2630 is elastically deformed. Accordingly, the second sealing member 2630 comes into close contact with the optical low-pass filter 410 and the optical member retaining member 2610.

With the above-described configuration, the space surrounded by the optical low-pass filter 410, the optical member retaining member 2610, the second sealing member 2630, and the optical member 460 is sealed. Thus, a closely sealed space, into which foreign matters, such as dusts, are prevented from entering, is formed.

The optical low-pass filter 410 and the second sealing member 2630 also function as a vibration transmission member for transmitting the vibration generated by the piezoelectric element 430. With the vibration transmitted via the optical low-pass filter 410 and the second sealing member 2630, foreign matters that have adhered to the surface of the optical low-pass filter 410 can be removed.

<B2-5. Method for Disassembling and Reassembling the Image Pickup Unit (FIGS. 15A, 15B, 16A, and 16B)>

As described above, in the present exemplary embodiment, the optical member retaining member 2610 and the plurality of optical members 410 and 460 or the image sensor unit 33*a* form the closely sealed space. However, although the space is closely sealed, intrusion of foreign matters may not be always prevented during assembly of the image pickup unit 2400.

Accordingly, if any intruded foreign matter is found by detection executed after completely assembling the image pickup unit 2400, disassembling the image pickup unit 2400 to remove the image pickup unit 2400 therefrom and reassembling the image pickup unit 2400 are to be performed.

Figure 15A:
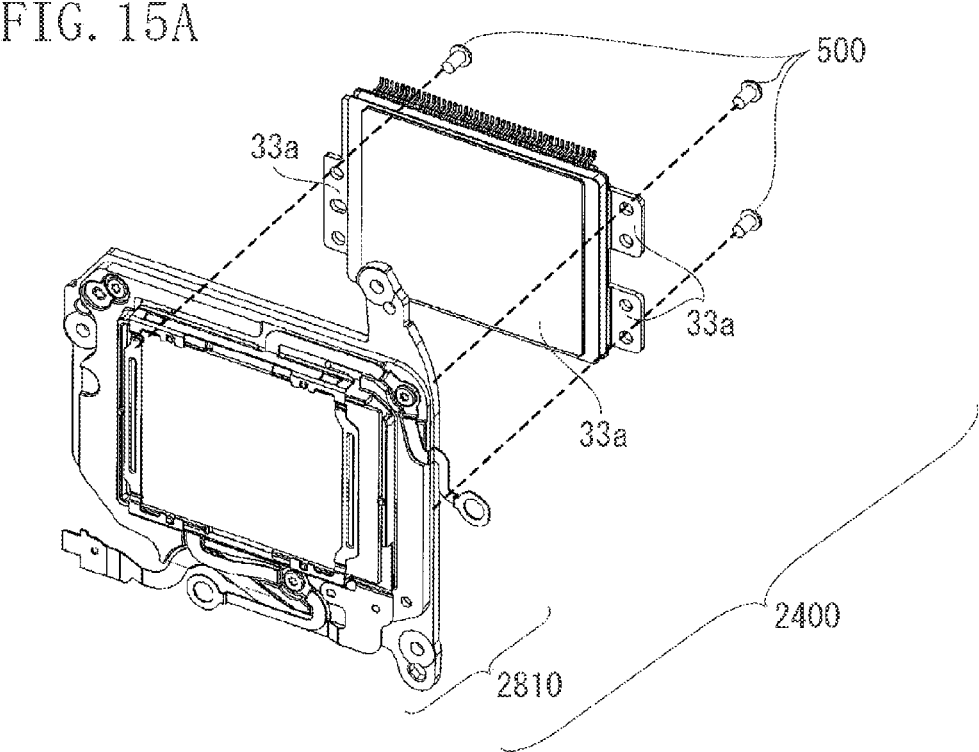
FIGS. 15A and 15B are exploded perspective diagrams illustrating an example of an image sensor unit included in the image pickup unit according to the second exemplary embodiment of the present invention.
Figure 15B:
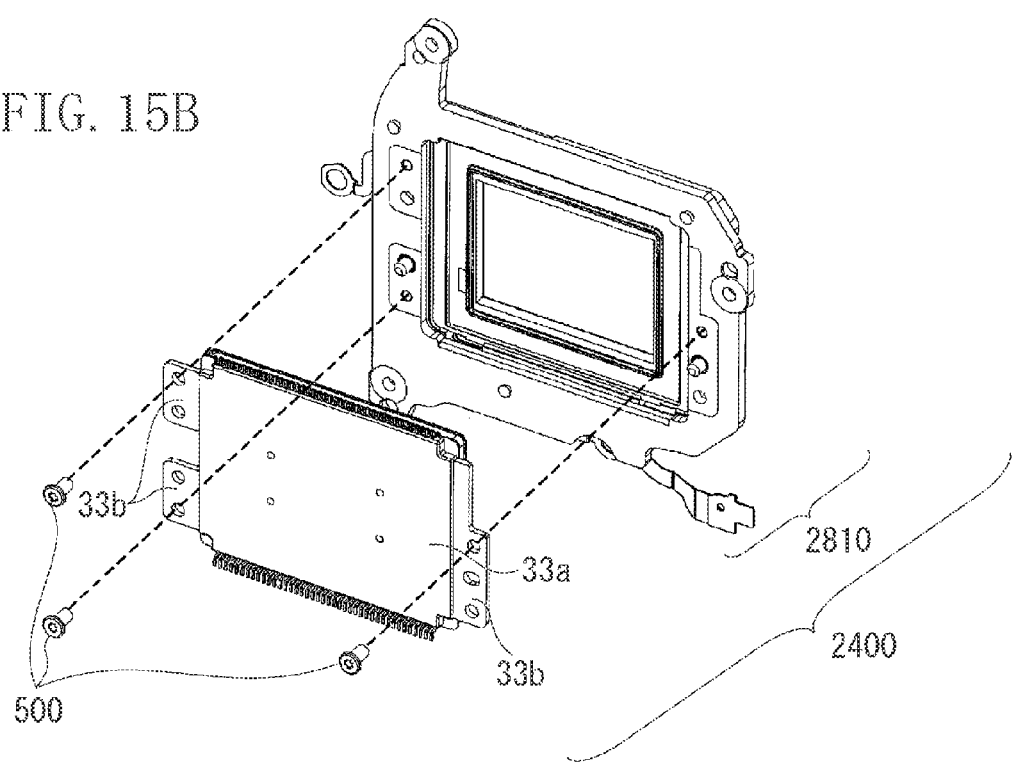

Now, an exemplary method for disassembling and reassembling the image pickup unit 2400 according to the present exemplary embodiment will be described in detail below with reference to FIGS. 15A, 15B, 16A, and 16B. Referring to FIGS. 15A and 15B, a component 2810 corresponds to a unit where the image sensor unit 33*a* is dismounted from the image pickup unit 2400.

In the present exemplary embodiment, the closely sealed space is formed by the first sealing member 2620. Accordingly, the image sensor unit 33*a* can be dismounted only by unscrewing the screw 500. Furthermore, the dismounted first sealing member 2620 can be remounted by using the screw 500.

Meanwhile, in the above-described conventional method, an image sensor unit and an optical element unit are closely fixed with each other by using an adhesive sheet. Accordingly, in the above-described conventional method, various situations may arise, such that the component members may be damaged when the adhesive sheet is peeled off during rework or that the peeled adhesive sheet may not be reused. Different from the conventional method, according to the present invention having the above-described configuration, the image pickup unit 2400 can be easily disassembled and reassembled. Furthermore, if any foreign matters have intruded the image pickup unit 2400, the foreign matters can be easily removed from the image pickup unit 2400 according to the present exemplary embodiment.

Figure 16A:
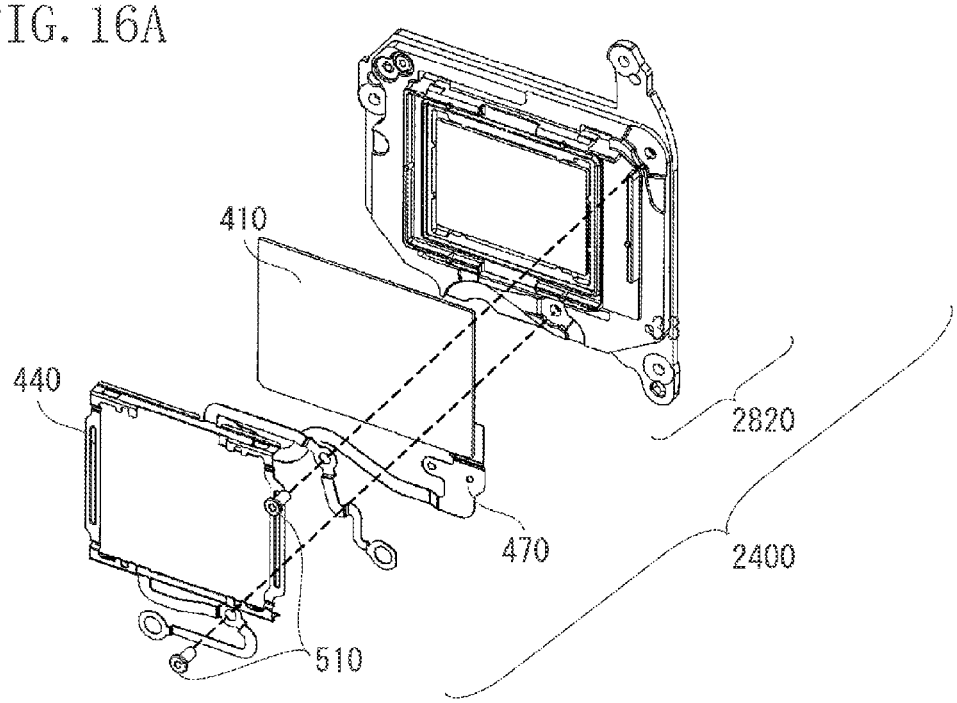
FIGS. 16A and 16B are exploded perspective diagrams illustrating an example of an optical low-pass filter included in the image pickup unit according to the second exemplary embodiment of the present invention.
Figure 16B:
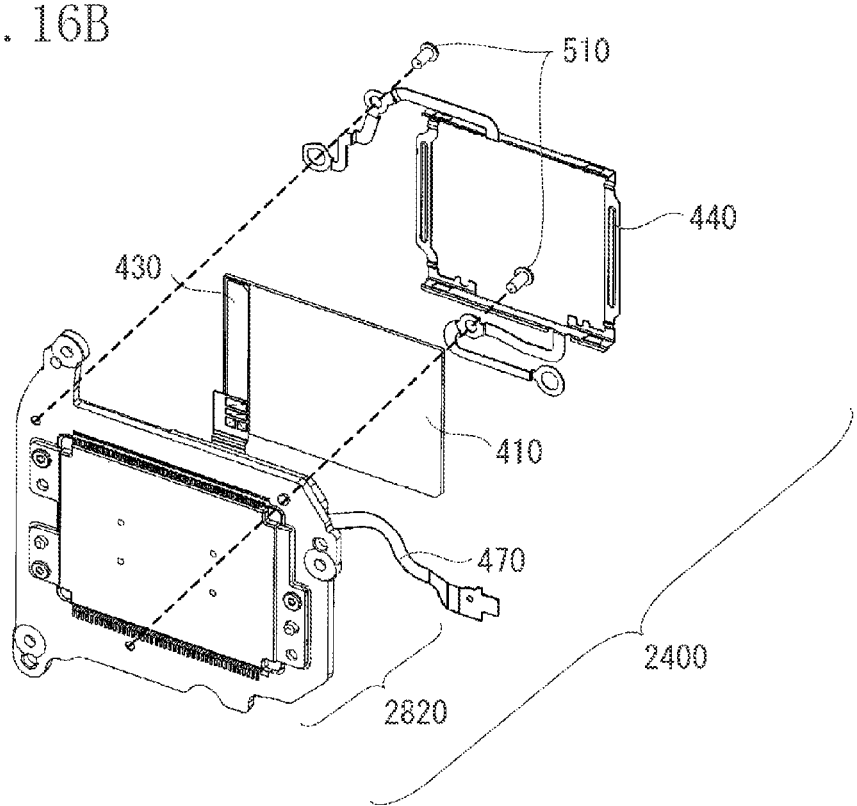

Referring to FIGS. 16A and 16B, a component 2820 is a unit where the pushing member 440, the optical low-pass filter 410, the piezoelectric element 430, and the flexible-printed circuit board 470 are dismounted from the image pickup unit 2400. With the above-described configuration, if any foreign matters that have entered the second sealing member 2630 and the optical low-pass filter 410 are found, the closely sealed space can be cleaned again only by dismounting the screw 510 and the pushing member 440.

As described above, in the present exemplary embodiment, the optical member retaining member 2610 retains the plurality of optical members 410 and 460 and the image sensor unit 33*a*. In addition, in the present exemplary embodiment, the first sealing member 2620 and the second sealing member 2630 are integrally formed. With the above-described configuration, the present exemplary embodiment can reduce the number of parts and the worker-hours necessary for manufacturing the image pickup unit 2400. In addition, according to the present exemplary embodiment having the configuration described above, it is enabled to easily disassemble, clean, and reassemble the image pickup unit 2400 if any foreign matters entering the closely sealed space of the image pickup unit 2400 is found during assembly thereof. Accordingly, the present exemplary embodiment can improve the workability of the image pickup unit 2400.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-207371 filed Sep. 8, 2009 and No. 2010-000674 filed Jan. 5, 2010 and No. 2010-007337 filed Jan. 15, 2010, which are hereby incorporated by reference herein in their entirety.

What is claimed is:

1. An apparatus comprising:
an image sensor unit;
an optical member provided closer to an object side than the image sensor unit;
a vibration generation unit configured to apply vibration to the optical member;
a retaining member configured to retain the image sensor unit on a photographer side and to retain the optical member on an object side;
a first sealing member configured, when the image sensor unit is mounted on the retaining member, to form a closely sealed space by sealing between the image sensor unit and the retaining member, the first sealing member being provided on the photographer side of the retaining member; and
a second sealing member configured, when the optical member is mounted on the retaining member, to form a closely sealed space by sealing between the optical member and the retaining member, the second sealing member being provided on the object side of the retaining member,
wherein when the vibration generation unit applies vibration to the optical member, a node appears at a predetermined position of the optical member, the second sealing member contacts the optical member at the predetermined position,
wherein the first sealing member and the second sealing member are provided on the retaining member separately, and
wherein a bottom surface of the second sealing member is closer to the photographer side of the retaining member than a bottom surface of the first sealing member.

2. The apparatus according to claim 1, wherein the first sealing member is closer to an optical axis more than the second sealing member.

3. The apparatus according to claim 1, wherein the first sealing member includes an elastic member and is formed on the retaining member.

4. The apparatus according to claim 1, wherein the second sealing member includes an elastic member and is formed on the retaining member.

5. The apparatus according to claim 1, wherein the optical member is an optical low-pass filter.

6. An apparatus comprising:
an image sensor unit;
an optical member provided closer to an object side than the image sensor unit;
a first retaining member configured to retain the optical member;
a vibration generation unit configured to apply vibration to the optical member;
a second retaining member configured to retain the image sensor unit on a photographer side and to retain the first retaining member on the object side;
a first sealing member including an elastic member that is formed with the first retaining member on the photographer side and configured to seal between the image sensor unit and the first retaining member and to form a closely sealed space; and a second sealing member including an elastic member that is formed with the first retaining member on the object side and configured to seal between the optical member and the first retaining member and to form a closely sealed space, wherein when the vibration generation unit applies vibration to the optical member, a node appears at a predetermined position of the optical member, the second sealing member contacts the optical member at the predetermined position, wherein the first sealing member and the second sealing member are formed with the first retaining member separately, and wherein a bottom surface of the second sealing member is closer to the photographer side of the retaining member than a bottom surface of the first sealing member.

7. The apparatus according to claim 6, wherein the first sealing member is closer to an optical axis more than the second sealing member.

8. The apparatus according to claim 6, wherein the first sealing member includes an elastic member and is formed on the first retaining member.

9. The apparatus according to claim 6, wherein the second sealing member includes an elastic member and is formed on the first retaining member.

10. The apparatus according to claim 6, wherein the optical member is an optical low-pass filter.

11. An apparatus comprising:
an image sensor unit;
an optical member provided closer to an object side than the image sensor unit;
a retaining member configured to retain the image sensor unit on a photographer side and to retain the optical member on an object side;
a first sealing member configured, when the image sensor unit is mounted on the retaining member, to form a closely sealed space by sealing between the image sensor unit and the retaining member, the first sealing member being provided on the photographer side of the retaining member; and
a second sealing member configured, when the optical member is mounted on the retaining member, to form a closely sealed space by sealing between the optical member and the retaining member, the second sealing member being provided on the object side of the retaining member,
wherein the first sealing member and the second sealing member are provided on the retaining member separately, and
wherein a bottom surface of the second sealing member is closer to the photographer side of the retaining member than a bottom surface of the first sealing member.

12. The apparatus according to claim 11, wherein the first sealing member is closer to an optical axis more than the second sealing member.

13. The apparatus according to claim 11, wherein the first sealing member includes an elastic member and is formed on the retaining member.

14. The apparatus according to claim 11, wherein the second sealing member includes an elastic member and is formed on the retaining member.

15. The apparatus according to claim 11, wherein the optical member is an optical low-pass filter.

16. An apparatus comprising:
an image sensor unit;
an optical member provided closer to an object side than the image sensor unit;
a first retaining member configured to retain the optical member;
a second retaining member configured to retain the image sensor unit on a photographer side and to retain the first retaining member on the object side;
a first sealing member including an elastic member that is formed with the first retaining member on the photographer side and configured to seal between the image sensor unit and the first retaining member and to form a closely sealed space; and
a second sealing member including an elastic member that is formed with the first retaining member on the object side and configured to seal between the optical member and the first retaining member and to form a closely sealed space,
wherein the first sealing member and the second sealing member are formed with the first retaining member separately, and
wherein a bottom surface of the second sealing member is closer to the photographer side of the retaining member than a bottom surface of the first sealing member.

17. The apparatus according to claim 16, wherein the first sealing member is closer to an optical axis more than the second sealing member.

18. The apparatus according to claim 16, wherein the first sealing member includes an elastic member and is formed on the first retaining member.

19. The apparatus according to claim 16, wherein the second sealing member includes an elastic member and is formed on the first retaining member.

20. The apparatus according to claim 16, wherein the optical member is an optical low-pass filter.

* * * * *